(12) United States Patent
Kamai et al.

(10) Patent No.: US 9,929,411 B2
(45) Date of Patent: Mar. 27, 2018

(54) CARBON-BASED MATERIAL, ELECTRODE CATALYST, ELECTRODE, GAS DIFFUSION ELECTRODE, ELECTROCHEMICAL DEVICE, FUEL BATTERY, AND PROCESS FOR PRODUCING CARBON-BASED MATERIAL

(71) Applicant: Panasonic Intellectual Property Management Co., Ltd., Osaka (JP)

(72) Inventors: Ryo Kamai, Hyogo (JP); Shuji Nakanishi, Osaka (JP); Yuya Suzuki, Osaka (JP); Yuuki Kitade, Osaka (JP); Takao Hayashi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 418 days.

(21) Appl. No.: 14/401,219

(22) PCT Filed: Jul. 4, 2013

(86) PCT No.: PCT/JP2013/004156
§ 371 (c)(1),
(2) Date: Nov. 14, 2014

(87) PCT Pub. No.: WO2014/006908
PCT Pub. Date: Jan. 9, 2014

(65) Prior Publication Data
US 2015/0303487 A1 Oct. 22, 2015

(30) Foreign Application Priority Data

Jul. 6, 2012 (JP) .................... 2012-152714
Jul. 6, 2012 (JP) .................... 2012-152715
(Continued)

(51) Int. Cl.
*H01M 4/90* (2006.01)
*C25B 11/12* (2006.01)
(Continued)

(52) U.S. Cl.
CPC .......... *H01M 4/9083* (2013.01); *C01B 32/05* (2017.08); *C01B 32/20* (2017.08); *C25B 11/12* (2013.01);
(Continued)

(58) Field of Classification Search
None
See application file for complete search history.

(56) References Cited

U.S. PATENT DOCUMENTS 6,355,377 B1   3/2002  Sheem et al.
2004/0232392 A1  11/2004  Masuko et al.
(Continued)

FOREIGN PATENT DOCUMENTS

CN   101041431 A    9/2007
JP   2009-277360 A  11/2009
(Continued)

OTHER PUBLICATIONS

Extended European Search Report dated Nov. 19, 2015 for corresponding European Application No. 13813280.8.
(Continued)

*Primary Examiner* — Guinever S Gregorio
(74) *Attorney, Agent, or Firm* — Renner Otto Boisselle & Sklar, LLP

(57) ABSTRACT

A carbon-based material according to the present invention contains dopant atoms of metal and non-metal such as nitrogen. In a radial distribution function obtained by Fourier transform of a K-edge EXAFS of the metal, a ratio of "A" to "B" is equal to or more than 4.0, wherein "A" denotes an intensity of the highest one of peaks around a distance
(Continued)

equal to a coordinate bond length between atoms of the metal and the non-metal and "B" denotes an intensity of the highest one of peaks around a distance equal to a metallic bond length between atoms of the metal. Note that when the metal is platinum, in a radial distribution function obtained by Fourier transform of an LIII-edge EXAFS of the platinum, a ratio of "A" to "B" is equal to or more than 4.0.

17 Claims, 17 Drawing Sheets

(30) Foreign Application Priority Data

Dec. 4, 2012 (JP) ................ 2012-265684
Dec. 4, 2012 (JP) ................ 2012-265685

(51) Int. Cl.

| | |
|---|---|
| H01M 4/96 | (2006.01) |
| H01M 4/86 | (2006.01) |
| H01M 4/92 | (2006.01) |
| H01G 11/32 | (2013.01) |
| C01B 32/05 | (2017.01) |
| C01B 32/20 | (2017.01) |
| H01M 8/1018 | (2016.01) |

(52) U.S. Cl.
CPC .......... *H01G 11/32* (2013.01); *H01M 4/8605* (2013.01); *H01M 4/90* (2013.01); *H01M 4/926* (2013.01); *H01M 4/96* (2013.01); *H01M 2008/1095* (2013.01); *Y02E 60/13* (2013.01)

(56) References Cited

U.S. PATENT DOCUMENTS

| | | |
|---|---|---|
| 2011/0136036 A1 | 6/2011 | Miyata et al. |
| 2011/0229766 A1 | 9/2011 | Ozaki et al. |
| 2011/0245071 A1 | 10/2011 | Tanabe |
| 2011/0260119 A1* | 10/2011 | Zelenay ............ H01M 4/9083 252/513 |
| 2012/0231338 A1 | 9/2012 | Matsuzaka et al. |
| 2013/0217567 A1 | 8/2013 | Kishimoto et al. |
| 2013/0288888 A1 | 10/2013 | Miyata et al. |
| 2014/0051860 A1 | 2/2014 | Tanabe |
| 2014/0353144 A1* | 12/2014 | Nakanishi ............ C25B 11/03 204/252 |

FOREIGN PATENT DOCUMENTS

| | | |
|---|---|---|
| JP | 2011-115760 A | 6/2011 |
| WO | WO 2007/145147 A1 | 12/2007 |
| WO | WO 2009/148115 A1 | 12/2009 |
| WO | WO 2010/064556 A1 | 6/2010 |
| WO | WO 2013/089026 A1 | 6/2013 |

OTHER PUBLICATIONS

Partial Supplemental European Search Report for corresponding European Application No. 13813280.8 dated Aug. 31, 2015.

International Search Report for corresponding International Application No. PCT/JP2013/004156 dated Aug. 6, 2013.

Form PCT/ISA/237 for corresponding International Application No. PCT/JP2013/004156 dated Aug. 6, 2013.

Yuta Nabae et al., "Multi-step pyrolysis of Fe phthalocyanine and phenolic resin for non-precious metal cathode catalysts", The Electrochemical Society, ECS Transactions, 2010, 33(1), pp. 587-593 (Alternative Reference for Non Patent Literature 1 listed on p. 3 of the specification).

Hey Ryung Byo et al., "Graphene-Based Non-Noble-Metal Catalysts for Oxygen Reduction Reaction in Acid", Chemistry of Materials, Jul. 18, 2011, 23, pp. 3421-3428 (listed on p. 4 of the specification).

* cited by examiner

CARBON-BASED MATERIAL, ELECTRODE CATALYST, ELECTRODE, GAS DIFFUSION ELECTRODE, ELECTROCHEMICAL DEVICE, FUEL BATTERY, AND PROCESS FOR PRODUCING CARBON-BASED MATERIAL

TECHNICAL FIELD

The present invention relates to: carbon-based materials suitable for use as catalysts; electrode catalysts including the carbon-based material; electrodes and gas diffusion electrodes each including the electrode catalyst; electrochemical devices and fuel batteries each including the electrode or gas diffusion electrode; and process for producing the carbon-based material.

BACKGROUND ART

The following oxygen reduction reaction is a cathode reaction in a $H_2/O_2$ fuel battery, brine electrolysis, and the like, and plays an important role in an electrochemical energy conversion device and the like.

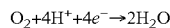

The following oxygen evolution reaction which is a reverse reaction of the oxygen reduction reaction is an anode reaction in water electrolysis and the like, and also plays an important role therein.

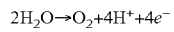

To promote the oxygen reduction reaction or the oxygen evolution reaction in various devices, noble metal such as platinum, ruthenium oxide, and iridium oxide has been widely and normally used as a catalyst.

However, these kinds of noble metal are rare and expensive, and the costs thereof are unstable. Therefore, using noble metal poses problems in view of saving natural resources, ensuring availability, lowering the cost, and the like.

In this regard, recently, as an oxygen reduction reaction catalyst, a carbon-based member doped with metal and nitrogen has been developed and has attracted attention as a promising catalyst altetive to noble metal. For example, non Patent Literature 1 discloses that a carbon-based crystal containing iron and nitrogen is prepared by heating a mixture of iron phthalocyanine and a phenolic resin at a heating temperature ranging from 700° C. to 900° C. for a heating time ranging from two to three hours under inert atmosphere, and that the carbon-based crystal functions as a catalyst promoting oxygen reduction. Besides, non Patent Literature 1 discloses that in a catalyst formation process, iron has also a catalytic function of promoting crystallization of the carbon-based crystal.

Non Patent Literature 2 discloses that a carbon-based crystal containing iron and nitrogen is obtained by preparing a mixture of graphene oxide, iron chloride, and graphitic carbon nitride (g-$C_3H_4$), chemically-reducing the graphene oxide of the mixture to graphene using a reducing agent, and then heating the resultant mixture at a heating temperature of 800° C. for a heating time of two hours under argon atmosphere. Besides, non Patent Literature 2 discloses that the carbon-based crystal functions as a catalyst for promoting oxygen reduction.

In order that such a catalyst shows sufficient catalytic activity, it is required to sufficiently increase the number of reaction active centers by sufficiently widening an area per sheet of graphene sheets, or to dope one graphene sheet with more amounts of iron and nitrogen, the graphene sheets composing of the carbon-based crystal. To achieve this, in the past, attempted have been methods of increasing the heating temperature under inert atmosphere for preparing the carbon-based crystal and of increasing the heating time.

CITATION LIST

Non Patent Literature

Non Patent Literature 1: Carbon, Vol. 48, No. 9. (2 Aug. 2010), p. 2613-2624
Non Patent Literature 2: Chem. Mater. 2011. 23, 3421-3428

SUMMARY OF INVENTION

Technical Problem

The present invention has been made in view of the above insufficiencies, and the object thereof is to provide: a carbon-based material with high catalytic activity which can be easily obtained; an electrode catalyst including the carbon-based material; an electrode and a gas diffusion electrode each including the electrode catalyst; an electrochemical device and a fuel battery each including the electrode or the gas diffusion electrode; and a process for producing the carbon-based material.

Solution to Problem

A carbon-based material according to an aspect is prepared by doping a base made of graphite or amorphous carbon particles with atoms of metal and non-metal, the non-metal including at least one of nitrogen, boron, sulfur, and phosphorus. When the metal is not platinum, in a radial distribution function obtained by Fourier transform of a K-edge extended X-ray absorption fine structure (EXAFS) of the metal, a ratio of "A" to "B" is equal to or more than 4.0, wherein "A" denotes an intensity of the highest one of peaks around a distance equal to a coordinate bond length between atoms of the metal and the non-metal and "B" denotes an intensity of the highest one of peaks around a distance equal to a metallic bond length between atoms of the metal. When the metal is platinum, in a radial distribution function obtained by Fourier transform of an LIII-edge extended X-ray absorption fine structure (EXAFS) of the platinum, a ratio of "A" to "B" is equal to or more than 4.0, wherein "A" denotes an intensity of the highest one of peaks around a distance equal to a coordinate bond length between atoms of the platinum and the non-metal and "B" denotes an intensity of the highest one of peaks around a distance equal to a metallic bond length between atoms of the platinum.

The first carbon-based material according to the present aspect is prepared by the base made of graphite or amorphous carbon particles with atoms of metal (note that, the metal is not platinum) and non-metal, the non-metal including at least one of nitrogen, boron, sulfur, and phosphorus. In the radial distribution function obtained by Fourier transform of the K-edge extended X-ray absorption fine structure (EXAFS) of the metal, the ratio of "A" to "B" is equal to or more than 4.0, wherein "A" denotes an intensity of the highest one of peaks around a distance equal to a coordinate bond length between atoms of the metal and the non-metal and "B" denotes an intensity of the highest one of peaks around a distance equal to a metallic bond length between atoms of the metal.

The second carbon-based material according to the present aspect is prepared by doping the base made of graphite or amorphous carbon particles with atoms of platinum and non-metal, the non-metal including at least one of nitrogen, boron, sulfur, and phosphorus. In the radial distribution function obtained by Fourier transform of the LIII-edge extended X-ray absorption fine structure (EXAFS) of the platinum, the ratio of "A" to "B" is equal to or more than 4.0, wherein "A" denotes an intensity of the highest one of peaks around a distance equal to a coordinate bond length between atoms of the platinum and the non-metal and "B" denotes an intensity of the highest one of peaks around a distance equal to a metallic bond length between atoms of the platinum.

The carbon-based material in the present aspect refers to a material mainly made of carbon. In the present aspect, the carbon-based material is mainly made of graphite or amorphous carbon particles. The binding energy spectrum of the carbon-based material obtained by X-ray photoelectron spectroscopy preferably shows a peak derived from a 1s orbital of a carbon atom.

The carbon-based material preferably satisfies the following requirement (1) or (2). When the carbon-based material satisfies the requirement (1), it is confirmed that the carbon-based material is mainly made of graphite. When the carbon-based material satisfies the requirement (2), it is confirmed that the carbon-based material is mainly made of amorphous carbon.

(1) An intensity of a (002) peak in an X-ray diffraction pattern of the carbon-based material is ten or more times as high as an intensity of a (002) peak of an X-ray diffraction pattern of ketjenblack "EC300J" (product name) available from Lion Corporation. Note that the X-ray diffraction patterns are obtained by X-ray diffraction measurement by use of CuKα radiation.

(2) The intensity of the (002) peak in the X-ray diffraction pattern of the carbon-based material is less than ten times as high as the intensity of the (002) peak of the X-ray diffraction pattern of ketjenblack "EC300J" (product name) available from Lion Corporation, and a spherical cluster or an aggregate thereof is mainly found in observation of the carbon-based material with a transmission electron microscope (TEM). Note that the X-ray diffraction patterns are obtained by X-ray diffraction measurement by use of CuKα radiation. Besides, the spherical cluster refers to a cluster having an aspect ratio in any cross-section ranging from 0.01 to 1.

In the present aspect, "being doped with atoms of the non-metal" in the carbon-based material refers to being chemically bonded to atoms of the non-metal, for atoms to compose the carbon-based material. It is particularly preferable that an atom of the non-metal be incorporated into a carbon skeleton of the carbon-based material. More specifically, one or more carbon atoms of the carbon skeleton composed of sp2 carbon atoms which are sequentially bonded to each other is preferably replaced by dopant atom[s], for example.

It can be determined by Raman spectroscopy, for example, whether the carbon-based material containing an atom of the non-metal as a dopant. Specifically, whether the carbon-based material contains an atom of the non-metal as a dopant can be determined by the following method. First, find a G-band peak and a D-band peak in a Raman spectrum of the carbon-based material obtained by Raman spectroscopy. The G-band peak is derived from a $sp^2$-bond between carbon atoms while the D-band peak derived from a defect in an $sp^2$-bond between carbon atoms. In this regard, when a carbon-based material contains a dopant of a further element, a ratio of "Id" to "Ig" is increased wherein "Id" represents an intensity of the D-band peak and "Ig" represents an intensity of G-band peak. Accordingly, when the intensity ratio of "Id" to "Ig" is greater in the carbon-based material of interest than that of a non-doped carbon-based material, it is confirmed that the carbon-based material contains a dopant of a further element.

It can be determined also by X-ray photoelectron spectroscopy whether the carbon-based material containing an atom of the non-metal as a dopant. Specifically, it can be determined whether the carbon-based material containing an atom of the non-metal as a dopant, based on a position of a peak (e.g., position of a peak derived from an electron in a 1s orbital of a nitrogen atom) derived from an atom of the non-metal to be added into the carbon-based material in a binding energy spectrum of the carbon-based material obtained by X-ray photoelectron spectroscopy. For example, in a case where the non-metal atom is a nitrogen atom, the peak derived from the electron in the 1s orbital of the nitrogen atom in the binding energy spectrum being around 399.9 eV demonstrates the presence of the nitrogen atom incorporated into the carbon skeleton.

In the present aspect, "being doped with atoms of the metal" in the carbon-based material refers to being chemically bonded to atoms of the metal, for atoms to compose the carbon-based material. It is particularly preferable that an atom of the metal be coordinated to an atom of the non-metal. In this case, the atom of the metal contained in the carbon-based material as a dopant may not be directly bonded to a carbon atom of the carbon-based material. The presence of the coordinate bond between atoms of the non-metal and the metal can be confirmed when a peak is present around a distance equal to a coordinate bond length between atoms of the metal and the non-metal in a radial distribution function obtained by Fourier transform of the K-edge extended X-ray absorption fine structure (EXAFS) of the metal of the carbon-based material. In this regard, the presence of the coordinate bond between atoms of the non-metal and the metal is confirmed by shifts, in a spectrum of the carbon-based material obtained by X-ray absorption spectroscopy (XAS), of absorption peaks derived from excitation of an inner shell electron of an atom of the non-metal (e.g., electron in the 1s orbital, when the non-metal is nitrogen) to an unoccupied orbital thereof and derived from excitation of an inner shell electron of an atom of the metal (e.g., electron in the 2p orbital, when the metal is an iron) to an unoccupied orbital thereof. When positions of the absorption peaks of a carbon-based material of interest are different from those of a further carbon-based material in which atoms of the non-metal and the metal are not coordinated to each other, and shifts of the absorption peaks of the carbon-based material of interest from corresponding absorption peaks of the further carbon-based material are in opposite directions, there should be a coordinate bond of the non-metal atom and the metal atom in the carbon-based material of interest. This is because, in the spectrum obtained by XAS, one of atoms of the non-metal and the metal which are coordinated to each other has an increased electron density and the other has a decreased electron density compared with those of atoms of the non-metal and the metal which are not coordinated to each other. In other words, this is because a peak of absorption energy derived from one of the non-metal and the metal which has the increased electron density shifts to the low energy side, and a peak of absorption energy derived from the other which has the decreased electron density shifts to the high energy side.

Advantageous Effects of Invention

According to the present invention, it is possible to improve catalytic activity of a carbon-based material. Besides, it is possible to relatively easily obtain the carbon-based material.

DESCRIPTION OF EMBODIMENTS

Figure 1:
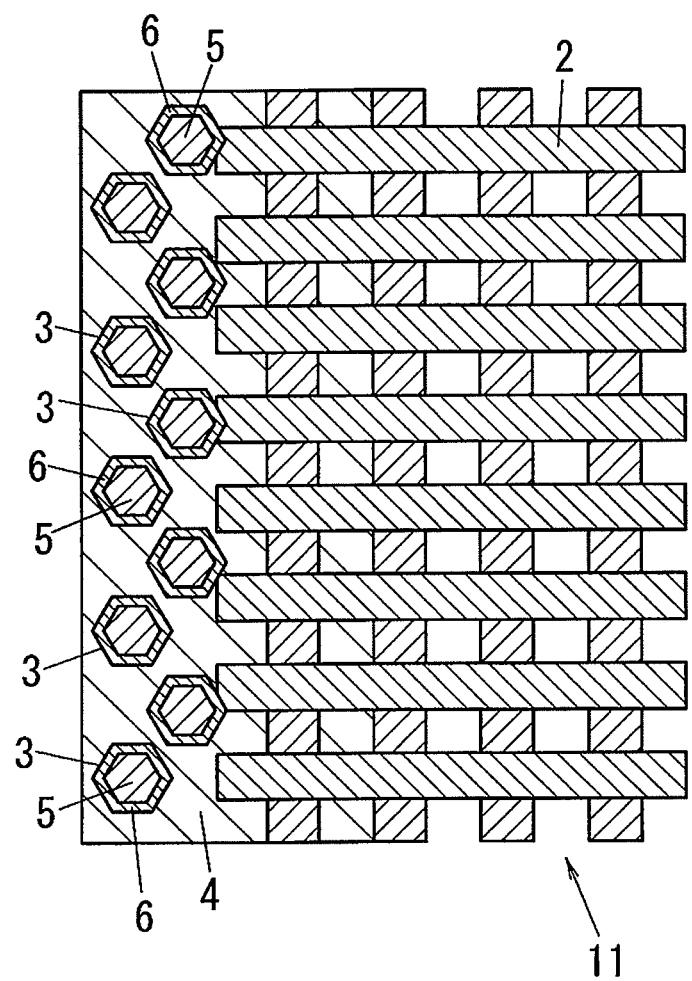
FIG. 1 is a cross-section of an example of a gas diffusion electrode of an embodiment of the present invention.

According to the present inventor's study, it was found that catalytic performance of a catalyst obtained by a conventional method was rather decreased when temperature and time of heating under an inactive gas atmosphere were increased in a manufacturing process for a carbon-based crystal. Besides, to obtain a catalyst made of graphene or graphene oxide, a complication step is required. In view of these circumstances, the prevent inventors studied a facilitated manufacture method for a carbon-based material with high catalytic activity using an available material instead of graphene or graphene oxide as a raw material.

The carbon-based material according to the first aspect, is mainly made of graphite or amorphous carbon particles. The carbon-based material according to the first aspect contains atoms of metal and non-metal as dopants, the non-metal including at least one of nitrogen, boron, sulfur, and phosphorus.

In the first carbon-based material according to the first aspect, the metal is not platinum. In this case, in a radial distribution function obtained by Fourier transform of a K-edge extended X-ray absorption fine structure (EXAFS) of the metal, a ratio of "A" to "B" is equal to or more than 4.0, wherein "A" denotes an intensity of the highest one of peaks around a distance equal to a coordinate bond length between atoms of the metal and the non-metal and "B" denotes an intensity of the highest one of peaks around a distance equal to a metallic bond length between atoms of the metal.

In the second carbon-based material according to the first aspect, the metal is platinum. In a radial distribution function obtained by Fourier transform of an LIII-edge extended X-ray absorption fine structure (EXAFS) of the platinum, a ratio of "A" to "B" is equal to or more than 4.0, wherein "A" denotes an intensity of the highest one of peaks around a distance equal to a coordinate bond length between atoms of the platinum and the non-metal, and "B" denotes an intensity of the highest one of peaks around a distance equal to a metallic bond length between atoms of the platinum.

An EXAFS of the metal in the carbon-based material is obtained by X-ray absorption spectroscopy. X-ray absorption spectroscopy includes a transmission mode, a fluorescence mode, and a conversion electron yield mode. In the present embodiment, it is preferable to use the transmission mode. Note that "the highest one of peaks around a distance equal to a metallic bond" is defined as a peak with the greatest absolute value of the local maximum value among peaks around the distance equal to the metallic bond length.

According to the first aspect, it is possible to improve catalytic activity of the carbon-based material. Besides, since readily available graphite or amorphous carbon particles can be used as a carbon source material to obtain the carbon-based material, it is possible to easily obtain the carbon-based material. Therefore, it is possible to easily obtain the carbon-based material with high catalytic activity.

The reason why the catalytic activity of the carbon-based material according to the first aspect is high may be that the carbon-based material contains no inactive metal compound and no metal crystal or contains little inactive metal compound and/or metal crystal. Therefore, the catalytic activity of the carbon-based material is less likely to be inhibited by the inactive metal compound and the metal crystal.

Note that, in the first aspect, it is determined, by the following manner, whether the carbon-based material does not contains at least one of the inactive metal compound and the metal atom or contains markedly little inactive metal compound and/or metal crystal. The metallic bond between atoms of the metal in the carbon-based material may occur in the inactive metal compound or in the metal crystal in the carbon-based material. Therefore, the intensity "B" of the highest one of peaks around the distance equal to the metallic bond length reflects an amount of the metal which composes the inactive metal compound and/or the metal crystal in the carbon-based material. In contrast, the coordinate bond between atoms of the metal and the non-metal may be made between an atom of the metal contained in the carbon-based material as a dopant and an atom of the non-metal contained in the carbon-based material as a dopant. Therefore, the intensity "A" of the highest one of peaks around the distance equal to the coordinate bond length between atoms of the metal and the non-metal may reflect a proportion of atoms of the metal contained in the carbon-based material as a dopant to all atoms of the metal contained in the carbon-based material. When the ratio of "A" to "B" is equal to or more than 4.0, the proportion of the atoms of the metal contained in the carbon-based material to the all atoms of the metal contained in the carbon-based material is great. Therefore, an amount of atoms of the metal which compose the inactive metal compound and/or the metal crystal contained in the carbon-based material is estimated as being small.

In this regard, the catalytic activity of the carbon-based material may occur at a position where the non-metal atom and the metal atom of the carbon-based material are coordinated to each other. In the first aspect, the ratio of "A" to "B" is not less than 4.0, namely, the proportion of the coordinate bond between the non-metal atom and the metal atom is great, and thus the catalytic activity of the carbon-based material may be high. Long-time calcination of the carbon-based material or the like may cause cleavage of the coordinate bond between atoms of the non-metal and the metal, and this cleavage may cause an aggregate in which atoms of the metal are likely to bond each other, generation of the inactive metal compound, and the like. Therefore, when the ratio of "A" to "B" is less than 4.0, there is smaller amount of the coordinate bond between atoms of the non-metal and the metal despite of the coordinate bond serving as a reaction center. As a result, the metal atoms aggregate, and thus amounts of the metal crystal and the inactive metal compound are increased. Accordingly, the catalytic activity may be decreased.

The ratio of "A" to "B" in peak intensity is preferably greater. It is particularly preferably that there is no peak around the distance equal to the metallic bond length of atoms of the metal.

Note that regarding a carbon-based catalyst obtained by a conventional method in which organic polymer is calcined for pyrolysis, the ratio of "A" to "B" is remarkably small and is smaller than 4.0. This may be because the conventional method requires long-time (about one to two hours) calcination, and the coordinate bond of atoms of the metal and the non-metal is cleaved, and as a result, an amount of aggregated atoms of the metal is increased. For example, the non-Patent Literatures disclose that a carbon-based catalyst is prepared through 2 hours calcination for pyrolysis. Thus-obtained carbon-based catalyst may have the ratio of "A" to "B" of about 2.0.

Note that the EXAFS refers to a fine structure on a high energy side of about 100 eV or more above an X-ray absorption edge in an XAFS (X-ray absorption fine structure) spectrum. Besides, a structure near an absorption edge in an XAFS spectrum is referred to as an XANES (X-ray absorption near edge structure).

In general, an EXAFS oscillation x(k) (intensity in absorption spectra regarding oscillation caused by an X-ray electron with a wavenumber k) is expressed by the following formula.

$$\chi(k) = \sum_i \frac{A_i}{R_i} \exp(-2k^2\sigma_i^2)\exp(-2R_i/\lambda)\sin(2kR_i + \delta_i)f_i(\pi) \quad \text{[Formula 1]}$$

$R_i$ represents a distance of an i-th scattering atom from an absorbing atom; $A_i$ represents the number of i-th scattering atoms; $\sigma_i$ represents an average squared amplitude of thermal oscillation of the i-th scattering atom; $\lambda$ represents a mean free path of photoelectron; $\delta_i$ represents a phase shift due to scatter caused by the i-th scattering atom; and $f_i(\pi)$ is an atomic scattering factor of the i-th scattering atom which back-scatters at a scattering angle of 180°. A radial distribution function is obtained by Fourier transform of $\chi(k)$.

In measurement of a K-edge EXAFS spectrum of the metal of the carbon-based material, it is preferable that a sample to be measured contain only the carbon-based material and do not contain a substance independently present from the carbon-based material such as a substance contaminated in the carbon-based material and a substance attached to the carbon-based material. Therefore, prior to the measurement of a K-edge EXAFS spectrum of the metal of the carbon-based material, it is required to sufficiently decrease the amount of the substance which is independently present from the carbon-based material by, for example, washing with an aqueous acid solution.

The methods of obtaining the EXAFS and the radial distribution function will be described more specifically.

First, an XAFS spectrum is measured in a transmission mode by use of an ion chamber detector, for example. Every measurement for the spectrum requires calibration of an energy axis in advance. For example, regarding the calibration of an energy axis for a CuK-edge XANES of Cu metal, a value at a local maximum point of a first peak is set at 8980.3 eV in a graph in which an X-axis shows energy while a Y-axis shows absorbance.

The radial distribution function is derived from data of the XAFS spectrum by the following manner.

First, a background noise is subtracted from the XAFS spectrum by a conventional manner. Subsequently, a base line to be an intensity axis "zero" is set so that this base line includes an origin at an absorption edge energy ($E_0$) and an average intensity in a range of −150 eV to −30 eV is zero. In addition, a further base line to be an intensity axis "one" is set so that an average intensity in a range of +150 eV to +550 eV is one. Note that these two base lines are set so that a medium between the two base lines is at the absorption edge energy ($E_0$), in a jump around the absorption edge energy ($E_0$) in the spectrum. Thereafter, a waveform thereof is adjusted by converting these two base lines into straight lines. According to these operations, the energy axis (unit: eV) is converted into a wavenumber axis (k, unit: 1/Å), and the EXAFS oscillation $\chi(k)$ defined by the above formula is extracted.

Then, the spectrum obtained by the above-mentioned operations is multiplied by the cube of k, and thereafter Fourier transform is conducted. The region of the k to be subjected to Fourier transform is set from 2.5 to 11.5 (1/Å). Accordingly, the radial distribution function having a Y-axis showing intensity and an X-axis showing an interatomic distance Ri. In this regard, a peak intensity in the radial distribution function refers to a local maximum value of the radial distribution function in the absolute value.

Note that the first carbon-based material according to the first aspect is determined on the basis of the K-edge extended X-ray absorption fine structure of an atom of the metal while the second carbon-based material is determined on the basis of the LIII-edge extended X-ray absorption fine structure of an atom of the platinum. This is because when the metal contained in the carbon-based material as a dopant is platinum, the LIII-edge extended X-ray absorption fine structure more clearly reflects a metallic bond between atoms of the platinum as well as the coordinate bond between atoms of the platinum and the non-metal.

Note that in the first aspect, the phrase "the highest one of peaks around a distance equal to a metallic bond length" and the phrase "the highest one of peaks around a distance equal to a coordinate bond length" are adopted in view of a case where a shift in a peak position occurs due to measurement error, distribution factor, periodic noises caused by Fourier transform, or the like. Practically, the highest one of peaks around a distance equal to the metallic bond length refers to "the highest one of peaks present at a distance equal to a metallic bond length", and the highest one of peaks around a distance equal to a coordinate bond length refers to "the highest one of peaks present at a distance equal to a coordinate bond length". Specifically, a range of "around a distance equal to the metallic bond length" refers to a range from the metallic bond length minus 0.3 Å to the metallic bond length plus 0.3 Å. Besides, a range of "around a distance equal to a coordinate bond length" refers to a range from the coordinate bond length minus 0.3 Å to the coordinate bond length plus 0.3 Å. The metallic bond length and the coordination bond length are determined on the basis of the radial distribution function of a standard sample having a known chemical structure obtained by Fourier transform of an EXAFS thereof.

To prepare the carbon-based material of the first aspect, the carbon source material may be selected from graphite and amorphous carbon. In other words, the carbon-based material mainly made of graphite or amorphous carbon particles, for example. When graphite is used as the carbon source material, namely, when the carbon-based material is mainly made of graphite, an intensity of a (002) peak in an X-ray diffraction pattern of the carbon-based material is preferably ten or more times as high as an intensity of a (002) peak of an X-ray diffraction pattern of ketjenblack "EC300J" (product name) available from Lion Corporation. In contrast, when amorphous carbon is used as the carbon source material, namely, when the carbon-based material mainly made of amorphous carbon particles, an intensity of a (002) peak in an X-ray diffraction pattern of the carbon-based material is preferably less than ten times as high as the intensity of the (002) peak of the X-ray diffraction pattern of ketjenblack "EC300J" (product name) available from Lion Corporation, and it is preferable that a spherical cluster or an aggregate thereof be mainly found in observation of the carbon-based material with a transmission electron microscope (TEM).

Note that the present inventors developed a carbon-based material made of graphene oxide as the carbon source material (Japanese application number: 2012-072265) before the present invention. This carbon-based material is obtained by heating, in a short time, a mixture of graphene oxide, a metal compound, and a nitrogen-containing compound having molecular weight of 800 or less in order to reduce the graphene oxide of the mixture to graphene and to dope thus-obtained graphene with a metal atom derived from the metal compound and a nitrogen atom derived from the nitrogen-containing compound. In this case, an oxygen-containing group (e.g., carboxyl group and hydroxide group) present between layers of graphite oxide is reduced in the heating, and as a result, $CO_2$ gas is generated between the layers. When a heating rate is faster in the heating, there is not sufficient time to discharge $CO_2$ gas between the layers of graphite oxide. Therefore, a pressure of generated $CO_2$ gas between the layers of graphite oxide is increased. As a result, a layer of the graphite oxide is peeled and the graphite oxide is reduced to prepare a graphene sheet. In this step, the metal compound and the non-metal compound are intercalated between the layers of graphite oxide, and thus doping with the metal atom and the non-metal atom is accelerated between the layers of graphite oxide. Also owing to these techniques, it is possible to decrease amounts of the inactive metal compound and the metal crystal contained in the carbon-based material, and therefore it is possible to improve the catalytic activity of the carbon-based material. Besides, in this carbon-based material, since graphene oxide is used as a carbon source material, it is easy to increase amounts of atoms of nitrogen and the metal contained in the carbon-based material as dopants, and there is an advantage in improving the catalytic activity.

In contrast, to obtain the carbon-based material according to the first aspect using graphite as the carbon source material, there is no generation of $CO_2$ gas between layers and thus no peeling of a layer to compose graphite, compared with a case of using graphene oxide as the carbon source material. Therefore, an atom of the non-metal may be less likely to be added between the layers of graphite as a dopant. Hence, compared with the case of using graphene oxide as the carbon source material, an amount of atoms of the non-metal as a dopant and an amount of atoms of the metal coordinated to the atoms of the non-metal are less likely to increase. In spite of this, the carbon-based material according to the first aspect can show comparable catalytic activity to the carbon-based material obtained by use of graphene oxide as the carbon source material. This may be because electrical conductivity of the carbon-based material is improved by use of graphite as the carbon source material, and in addition, a drop in electrical conductivity of the carbon-based material is suppressed by decreasing an amount of dopant atoms of the non-metal, and these improvement and drop may offer an advantage in improving the catalytic activity, especially when the carbon-based material is used as an electrode catalyst.

In a case where the carbon-based material according to the first aspect is obtained by use of amorphous carbon particles as the carbon source material, compared with the case of using graphene oxide as the carbon source material, crystallinity of the carbon-based material is decreased. This may cause a drop in reaction activity when the carbon-based material is used as an electrode catalyst and the like. Besides, since the amorphous carbon particles do not have a layer structure as shown in graphene oxide, there is no generation of $CO_2$ gas between layers, acceleration of doping owing to intercalation may not occur. In spite of this, the carbon-based material according to the first aspect can show comparable catalytic activity to the carbon-based material obtained by use of graphene oxide as a carbon source material. This may because when the amorphous carbon particles are used as the carbon source material, the amorphous carbon particles have a remarkably great surface area, and therefore a surface area of the carbon-based material is increased, and accordingly the number of active sites when the carbon-based material is used as a catalyst is increased. Besides, compared with a case of using graphite oxide as a raw material, an amount of atoms of the non-metal as a dopant may be smaller. Accordingly, a drop in electrical conductivity of the carbon-based material is suppressed, and this may offer an advantage in improving the catalytic activity, especially when the carbon-based material is used as an electrode catalyst.

According to the second aspect, in the carbon-based material of the first aspect, a molar ratio of atoms of the metal to atoms of carbon determined by XPS (X-ray photoelectron spectroscopy) is less than 0.01, and a molar ratio of atoms of the non-metal to atoms of the carbon is less than 0.05.

XPS measurement is conducted by use of a characteristic X-ray of Al as a beam under vacuum conditions of $3*10^{-8}$ Pa. The XPS measurement teaches an elemental composition of a surface layer of the carbon-based material in a predetermined region. Therefore, according to the XPS measurement, an amount of dopant atoms of the metal in the predetermined region is determined. Note that, the case where "the molar ratio of atoms of the metal to atoms of carbon determined by XPS is less than 0.01" includes a case where the amount of the metal is under a detection limit and the atom of the metal is not detected under conditions that the atom of the metal is detected when the molar ratio of atoms of the metal to atoms of the carbon is equal to or more than 0.01. The case where "a molar ratio of atoms of the non-metal to atoms of the carbon is less than 0.05" includes a case where the amount of the non-metal is under a detection limit and the atom of the non-metal is not detected under conditions that the atom of the non-metal is detected when the molar ratio of atoms of the non-metal to atoms of the carbon is equal to or more than 0.05.

Note that prior to the XPS measurement, it is required to sufficiently decrease an amount of a substance which is independently present from the carbon-based material by, for example, washing with an aqueous acid solution. Washing with acid is conducted by dispersing the carbon-based material in pure water for 30 min with a homogenizer, and thereafter adding the resultant carbon-based material into 2 M sulfuric acid, and mixing them at 80° C. for 3 hours.

According to the second aspect, it is possible to obtain the carbon-based material having high catalytic activity yet having a small amount of the dopant atoms of the metal.

The carbon-based material according to the third aspect referring to the first or the second aspect, includes: a doped layer containing atoms of the non-metal and the metal which is an outermost layer; and a layer which is inside the doped layer substantially consisting of the graphite or the amorphous carbon alone. That is, when the carbon-based material is mainly made of graphite, the layer which is inside the doped layer substantially consists of the graphite alone. Altevively, when the carbon-based material is mainly made of amorphous carbon particles, the layer which is inside the doped layer substantially consists of the amorphous carbon particles alone.

The doped layer is the outermost layer of the carbon-based material. The carbon-based material according to the third aspect is composed of a core layer and the doped layer covering the core layer, for example. In the core layer, atoms of the non-metal and the metal are not found, and the core layer substantially consists of graphite or amorphous carbon alone.

In the third aspect, the doped layer is the outermost layer, and the layer inside the doped layer substantially consists of the graphite or the amorphous carbon alone. Therefore, electrical conductivity of the carbon-based material is less likely to be inhibited. Hence, especially when the carbon-based material is used as an electrode catalyst, the catalytic activity thereof is further improved.

In the fourth aspect referring to any one of the first to third aspects, an X-ray diffraction pattern of the carbon-based material shows that a proportion of an intensity of the highest one of peaks derived from an inactive metal compound and a metal crystal to an intensity of a (002) peak is not more than 0.1.

Note that the X-ray diffraction pattern is obtained by X-ray diffraction measurement by use of CuKα radiation. For evaluation of a peak intensity of the X-ray diffraction pattern, a base line of the X-ray diffraction pattern is obtained by the Shirley method. The peak intensity in the X-ray diffraction pattern is determined with reference to the base line.

Note that prior to the X-ray diffraction measurement, it is required to sufficiently decrease an amount of a substance which is independently present from the carbon-based material by, for example, washing with an aqueous acid solution. Washing with acid is conducted by dispersing the carbon-based material in pure water for 30 min with a homogenizer, and thereafter adding the resultant carbon-based material into 2 M sulfuric acid, and mixing them at 80° C. for 3 hours.

In the fourth aspect, amounts of the inactive metal compound and the metal crystal in the carbon-based material are small, and therefore the catalytic activity of the carbon-based material is further improved.

The carbon-based material according to the fifth aspect referring to any one of the first to fourth aspect has a particle shape.

In this case, the carbon-based material can be easily supported on an appropriate member, and this carbon-based material can be easily used as a catalyst.

In the sixth aspect referring to any one of the first to fifth aspect, the non-metal includes nitrogen, and the metal includes iron. The non-metal may be nitrogen itself. The metal may be iron itself.

In the sixth aspect, the catalytic activity of the carbon-based material is further improved, and the carbon-based material shows excellent performance when used as an electrode catalyst, especially as an oxygen reduction electrode catalyst.

In the seventh aspect referring to any one of the first to fifth aspects, the non-metal includes nitrogen, and the metal includes at least one of cobalt and manganese. The non-metal may be nitrogen itself. The metal may be cobalt or manganese itself.

In the seventh aspect, the catalytic activity of the carbon-based material is further improved, and the carbon-based material shows excellent performance when used as an electrode catalyst especially as an oxygen evolution electrode catalyst.

An electrode catalyst according to the eighth aspect contains the carbon-based material according to any one of the first to seventh aspects.

In this case, the carbon-based material shows high catalytic activity, and therefore an electrode catalyst showing excellent performance is obtained. This electrode catalyst is suitable especially for use as an oxygen reduction electrode catalyst and an oxygen evolution electrode catalyst.

An electrode according to the ninth aspect includes the electrode catalyst according to the eighth aspect.

In this case, the electrode catalyst shows high catalytic activity, and therefore an electrode showing excellent performance is obtained. This electrode is suitable especially for use as an oxygen reduction electrode catalyst and an oxygen evolution electrode catalyst.

A gas diffusion electrode according to the tenth aspect contains the electrode catalyst according to the eighth aspect.

In this case, the electrode catalyst shows high catalytic activity, and therefore a gas diffusion electrode showing excellent performance is obtained. This gas diffusion electrode is suitable especially for use as an oxygen reduction electrode catalyst and an oxygen evolution electrode catalyst.

An electrochemical device according to the eleventh aspect includes the electrode according to the ninth aspect or the gas diffusion electrode according to the tenth aspect.

A fuel battery according to the twelfth aspect includes the electrode according to the ninth aspect or the gas diffusion electrode according to the tenth aspect.

Accordingly, the electrochemical device and the fuel battery which show excellent performance are obtained.

A process for producing a carbon-based material according to the thirteenth aspect, includes steps of: preparing a mixture of a non-metal containing compound, a metal compound, and a carbon source material, the non-metal containing compound containing non-metal including at least one of nitrogen, boron, sulfur, and phosphorus, and the carbon source material being selected from a group consisting of graphite and amorphous carbon particles; and heating the mixture to a temperature ranging from 800° C. to 1000° C. for a time of 45 sec or more but less than 600 sec when the carbon source material is graphite; or heating the mixture at a temperature ranging from 800° C. to 1000° C. for a time of 30 sec or more but less than 300 sec when the carbon source material is the amorphous carbon particles.

According to the thirteenth aspect, the catalytic activity of the carbon-based material is improved. Further, since readily available graphite or amorphous carbon particles are used as a carbon source material to prepare the carbon-based material, it is possible to easily obtain the carbon-based material. Accordingly, it is possible to easily obtain the carbon-based material with high catalytic activity.

In the thirteenth aspect, since the mixture is heated at a high temperature in a short time, generation of the inactive metal compound and/or the metal crystal without causing coordination of an atom of the metal to an atom of the non-metal may be suppressed, and therefore the catalytic activity of the carbon-based material may be increased. In other words, the carbon-based material does not contain the inactive metal compound and the metal crystal or contains reduced amounts of the inactive metal compound and the metal crystal, and therefore the catalytic activity of the carbon-based material is less likely to be inhibited by the inactive metal compound and the metal crystal.

Besides, when the mixture is heated at a high temperature in a short time, an atom of the metal coordinated to the atom of the non-metal is less likely to be desorbed. Therefore, desorption of atoms of the metal and aggregation of the desorbed atoms may be suppressed, and bonding of the desorbed atoms which aggregates may be suppressed. This may contribute to suppress generation of the inactive metal compound and the metal crystal. Besides, when the desorption of atoms of the metal from the carbon-based material is suppressed as described above, a sufficient amount of atoms of the metal is distributed over a surface layer of the carbon-based material. This may contribute to improve the catalytic activity of the carbon-based material.

According to the fourteenth aspect referring to the thirteenth aspect, the non-metal containing compound has a molecular weight of 800 or less.

In this case, the graphene or amorphous carbon particles are easily doped with atoms of the non-metal derived from the non-metal containing compound. This may be because, since the molecular weight of the non-metal containing compound is small, the non-metal containing compound is thermally decomposed in a short time, and therefore the opportunity for binding of atoms of the non-metal with carbon present in the graphene or amorphous carbon particles is increased.

According to the fifteenth aspect referring to the thirteenth or fourteenth aspect, the non-metal containing compound includes at least one compound selected from a group consisting of pentaethylenehexamine, ethylenediamine, tetraethylenepentamine, triethylenetetramine, and ethylenediamine.

In this case, the catalytic activity of the carbon-based material is remarkably improved.

The carbon-based material according to the sixteenth aspect is prepared by the process for producing a carbon-based material according to any one of the thirteenth to fifteenth aspects.

In this case, the catalytic activity of the carbon-based material is improved. Besides, since readily available graphite or amorphous carbon particles are used as the carbon source material to prepare the carbon-based material, it is possible to easily obtain the carbon-based material. Accordingly, it is possible to easily obtain the carbon-based material with high catalytic activity.

Specific embodiments of the present inventions will be described in more detail below.

First, the carbon-based material of the first embodiment will be described. A binding energy spectrum of the carbon-based material of the present embodiment obtained by X-ray photoelectron spectroscopy shows a peak derived from a is orbital of a carbon atom. Besides, the intensity of the (002) peak in the X-ray diffraction pattern of the carbon-based material of the present embodiment is preferably ten or more times as high as the intensity of the (002) peak of an X-ray diffraction pattern of ketjenblack "EC300J" (product name) available from Lion Corporation. Note that the (002) peaks of X-ray diffraction patterns of the carbon-based material and the ketjenblack "EC300J" are present at around 26° of 2θ. The θ represents an incident angle of X-rays to a sample in X-ray diffraction measurement. Besides, a base line of the X-ray diffraction pattern is obtained by the Shirley method, and, in the X-ray diffraction pattern, the peak intensity is determined with reference to the base line.

The carbon-based material of the present embodiment is obtained by doping graphite with atoms of the non-metal and the metal, for example. In other words, the carbon-based material of the present embodiment is mainly made of graphite, for example, and the graphite is doped with atoms of the non-metal and the metal.

The carbon-based material of the present embodiment is obtained by doping graphite with atoms of the non-metal and the metal, for example. According to this configuration, readily available graphite can be used as the carbon source material to prepare the carbon-based material of the present embodiment. Therefore, it is possible to easily obtain the carbon-based material.

The non-metal contained in the carbon-based material as a dopant includes at least one of nitrogen, boron, sulfur, and phosphorus.

The metal contained in the carbon-based material as a dopant is not particularly limited, but preferably includes at least one type of metal selected from titanium (Ti), vanadium (V), chromium (Cr), manganese (Mn), iron (Fe), cobalt (Co), nickel (Ni), cupper (Cu), zirconium (Zr), niobium (Nb), molybdenum (Mo), ruthenium (Ru), rhodium (Rh), palladium (Pd), silver (Ag), hafnium (Hf), tantalum (Ta), tungsten (W), rhenium (Re), osmium (Os), iridium (Ir), platinum (Pt), and gold (Au). In this case, the carbon-based material shows excellent performance particularly as catalysts for promoting an oxygen reduction reaction and an oxygen evolution reaction. The amount of atoms of the metal contained in the carbon-based material as a dopant may be arbitrarily selected so that the carbon-based material shows excellent catalytic performance.

As described above, the non-metal contained in the carbon-based material as a dopant includes at least one of nitrogen, boron, sulfur, and phosphorus. An amount of dopant atoms of the non-metal contained in the carbon-based material may be arbitrarily selected so that the carbon-based material shows excellent catalytic performance.

In the present embodiment, atoms of the non-metal and the metal may be mainly present in a surface layer of the carbon-based material. This may because, in a step of doping graphite with the atoms of the metal and the non-metal in the process for producing the carbon-based material, it is not easy for the atoms of the metal and the non-metal to intrude into the inside of graphite, and these atoms may be mainly added into the surface layer of the graphite. Accordingly, the carbon-based material may include a core layer substantially consisting of graphite, and a doped layer covering the core layer and containing atoms of the non-metal and the metal.

According to the measurement result (voltammogram) of the carbon-based material of the present embodiment obtained by cyclic voltammetry, the voltammogram shows a peak derived from a redox reaction involving an atom (ion) of the metal which is contained in the carbon-based material as a dopant. In other words, it can be determined whether the carbon-based material contains an atom of the metal as a dopant, based on presence of the peak derived from the redox reaction involving this atom of the metal. Besides, an average value (redox potential) of potentials at a peak position in the oxidation reaction and at a peak position in the reduction reaction in this voltammogram shifts depending on a type of the non-metal which is contained in the carbon-based material as a dopant. In other words, it can be determined whether an atom of the non-metal is contained in the carbon-based material as a dopant, based on the value of the redox potential or an amount of the shift. In addition, since an electrochemical reaction on the carbon-based material occurs on a surface of the carbon-based material, it is determined that the atoms of the metal and the non-metal are present in the surface layer of the carbon-based material.

The carbon-based material of the present embodiment does not contain particles having a diameter of 1 nm or more and containing at least one of the inactive metal compound and the metal crystal. It is particularly preferable that the carbon-based material contain no particle containing at least one of the inactive metal compound and the metal crystal, irrespective of its diameter. Accordingly, the carbon-based material of the present embodiment shows high catalytic activity.

Besides, in the present embodiment, when an atom of the metal which is not platinum is contained in the carbon-based material as a dopant, it is sufficient that, in the radial distribution function obtained by Fourier transform of the K-edge EXAFS of the metal, the ratio of "A" to "B" is equal to or more than 4.0, irrespective of whether or not the carbon-based material contains particles having a diameter of 1 nm or more and containing at least one of the inactive metal compound and the metal crystal, wherein "A" denotes an intensity of the highest one of peaks around a distance equal to a coordinate bond length between atoms of the metal and the non-metal and "B" denotes an intensity of the highest one of peaks around a distance equal to a metallic bond length between atoms of the metal. Also in this case, the carbon-based material of the present embodiment shows high catalytic activity. It is particularly preferable that the carbon-based material do not contain any particles having a diameter of 1 nm or more and containing at least one of the inactive metal compound and the metal crystal, and the ratio of "A" to "B" be equal to or more than 4.0.

Altetively, in the present embodiment, when platinum is contained in the carbon-based material as a dopant, in the radial distribution function obtained by Fourier transform of the LIII-edge EXAFS of the platinum, the ratio of "A" to "B" may be equal to or more than 4.0, irrespective of whether or not the carbon-based material contains particles having a diameter of 1 nm or more and containing at least one of the inactive metal compound and the metal crystal, wherein "A" denotes an intensity of the highest one of peaks around a distance equal to a coordinate bond length between atoms of the platinum and the non-metal and "B" denotes an intensity of the highest one of peaks around a distance equal to a metallic bond length between atoms of the platinum. Also in this case, the carbon-based material of the present embodiment shows high catalytic activity. It is particularly preferable that the carbon-based material do not contain any particles having a diameter of 1 nm or more and containing at least one of the inactive metal compound and the metal crystal, and the ratio of "A" to "B" be equal to or more than 4.0.

Note that, as described above, a range of "around a distance equal to a coordinate bond length" preferably refers to a range from the coordinate bond length minus 0.3 Å to the coordinate bond length plus 0.3 Å. Particularly when the metal is iron and the non-metal is nitrogen, the range of around the distance equal to the coordinate bond length preferably refers to a range of 1.5±0.1 Å. When the metal is iron and the non-metal is boron, the range of around the distance equal to the coordinate bond length preferably refers to a range of 2.4±0.2 Å. When the metal is iron and the non-metal is sulfur, the range of around the distance equal to the coordinate bond length preferably refers to a range of 2.3±0.2 Å. When the metal is iron and the non-metal is phosphorus, the range of around the distance equal to the coordinate bond length preferably refers to a range of 3.1±0.3 Å. When the metal is cobalt and the non-metal is nitrogen, the range of around the distance equal to the coordinate bond length preferably refers to a range of 1.4±0.2 Å. When the metal is cobalt and the non-metal is sulfur, the range of around the distance equal to the coordinate bond length preferably refers to a range of 2.3±0.2 Å. When the metal is cobalt and the non-metal is phosphorus, the range of around the distance equal to the coordinate bond length preferably refers to a range of 2.3±0.2 Å. When the metal is manganese and the non-metal is nitrogen, the range of around the distance equal to the coordinate bond length preferably refers to a range of 2.1±0.3 Å. When the metal is manganese and the non-metal is sulfur, the range of around the distance equal to the coordinate bond length preferably refers to a range of 2.4±0.2 Å. When the metal is platinum and the non-metal is nitrogen, the range of around the distance equal to the coordinate bond length preferably refers to a range of 2.0±0.2 Å.

In addition, as described above, a range of "around a distance equal to a metallic bond length" preferably refers to a range from the metallic bond length minus 0.3 Å to the metallic bond length plus 0.3 Å. Particularly when the metal is iron, the range of around the distance equal to the metallic bond length preferably refers to a range of 2.1±0.1 Å. When the metal is cobalt, the range of around the distance equal to the metallic bond length preferably refers to a range of 2.2±0.2 Å. When the metal is manganese, the range of around the distance equal to the metallic bond length preferably refers to a range of 2.7±0.3 Å. When the metal is platinum, the range of around the distance equal to the metallic bond length preferably refers to a range of 2.8±0.2 Å.

Besides, in the carbon-based material of the present embodiment, it is preferable that the molar ratio of atoms of the metal to atoms of carbon determined by XPS be less than 0.01, and the molar ratio of atoms of the non-metal to atoms of the carbon is less than 0.05. In this case, amounts of the metal and the non-metal are small in the predetermined region of the surface layer of the carbon-based material, and therefore it may be determined that amounts of dopant atoms of the metal and the non-metal in the carbon-based material are small. The molar ratio of atoms of the metal to atoms of the carbon is particularly preferably zero. Besides, the molar ratio of atoms of the non-metal to atoms of the carbon is preferably zero. Note that these molar ratios are only values determined by XPS measurement. Therefore, even when these values are zero, amounts of atoms of the metal and the non-metal in the surface layer of the carbon-based material may not be zero, practically. Presence of atoms of the metal and the non-metal is confirmed based on measurement results obtained by cyclic voltammetry of the carbon-based material, as described above.

It is preferable that the carbon-based material of the present embodiment include the doped layer containing atoms of the non-metal and the metal as the outermost layer, and a layer inside the doped layer substantially consist of graphite. In this case, since the layer inside the doped layer substantially consists of graphite, electrical conductivity of the carbon-based material is less likely to be inhibited.

It is preferable that an X-ray diffraction pattern of the carbon-based material show that a proportion of an intensity of the highest one of peaks derived from the inactive metal compound and the metal crystal to an intensity of the (002) peak is not more than 0.1. In this case, the percentages of the inactive metal compound and the metal crystal in the carbon-based material are remarkably small. The proportion in intensity of peak is preferably smaller. It is particularly preferable that the peaks derived from the inactive metal compound and the metal crystal be not found in the X-ray diffraction pattern.

Note that, in X-ray diffraction measurement of the carbon-based material of the present embodiment, it is preferable that a sample to be measured contain only the carbon-based material and do not contain a substance independently present from the carbon-based material such as a substance contaminated in the carbon-based material and a substance attached to the carbon-based material. Therefore, prior to the X-ray diffraction measurement of the carbon-based material, it is required to sufficiently decrease the amount of the substance which is independently present from the carbon-based material by, for example, washing with an aqueous acid solution.

The carbon-based material of the present embodiment shows excellent catalytic performance when used as the electrode catalyst, as described above. In particular, when used as the oxygen reduction catalyst or the oxygen evolution catalyst, the carbon-based material shows excellent catalytic performance.

A combination of the metal and the non-metal which are contained in the carbon-based material as dopants are appropriately selected. Particularly when the carbon-based material is used as the oxygen reduction electrode catalyst, it is preferable that the non-metal include nitrogen and the metal includes iron. In this case, the carbon-based material can show remarkably excellent catalytic activity. The non-metal may be nitrogen itself and the metal may be iron itself.

When the carbon-based material is applied to the oxygen evolution electrode, it is preferable that the non-metal include nitrogen, and the metal include at least one of cobalt and manganese. In this case, the carbon-based material can show remarkably excellent catalytic activity. The non-metal may be nitrogen itself. The metal may be cobalt or manganese itself, or a combination of cobalt and manganese.

The shape of the carbon-based material is not particularly limited. For example, the carbon-based material may have a particle shape.

When the carbon-based material having the particle shape is used as the electrode catalyst, the carbon-based material is supported on an electrode, for example. In this case, the electrode on which the catalyst containing the carbon-based material is provided is easily formed.

The carbon-based material may have a sheet shape. The size of the carbon-based material having the sheet shape is not particularly limited, and the carbon-based material may have a micro size.

The carbon-based material having the sheet shape may be porous. The porous carbon-based material having the sheet shape may be in a woven cloth form or in non-woven cloth form, for example. Such a carbon-based material is preferably used to compose an electrode, and particularly preferably used to compose a gas diffusion electrode. Details of the electrode containing the porous carbon-based material having the sheet shape will be described below.

Then, the process for producing a carbon-based material of the first embodiment will be described. The process for producing a carbon-based material of the present embodiment includes steps of: preparing a mixture of a non-metal containing compound, a metal compound, and graphite, the non-metal containing compound containing non-metal including at least one of nitrogen, boron, sulfur, and phosphorus; and heating the mixture to a temperature ranging from 800° C. to 1000° C. for a time of 45 sec or more but less than 600 sec.

The process for producing the carbon-based material of the present embodiment will be described more specifically.

Among the starting materials, the graphite which is the carbon source material is prepared by a known method. A representative example of the manufacturing method for graphite may be a method including a step of pyrolyzing an organic polymer.

An intensity of a (002) peak in an X-ray diffraction pattern of the graphite is preferably ten or more times as high as the intensity of a (002) peak of the X-ray diffraction pattern of ketjenblack "EC300J" (product name) available from Lion Corporation.

The shape of the graphite is arbitrarily selected in view of a desired shape of the carbon-based material. For example, to prepare the carbon-based material having a particle shape, graphite having a particle shape is used.

Altetively, to prepare the carbon-based material having a sheet shape, graphite having a sheet shape is used. Besides, to prepare the porous carbon-based material having a sheet shape, porous graphite having a sheet shape is used. The porous carbon-based material having a sheet shape may be a woven fabric or a non-woven fabric made of graphite fibers. When the graphite having a sheet shape is used, the size of the graphite is not particularly limited, and the graphite may have a micro size, for example.

The metal compound is not particularly limited so long as it contains metal capable of coordinating to an atom of the non-metal with which graphite is to be doped. Examples of the metal compound include: inorganic metal salts (e.g., chloride salts, nitrate salts, sulfuric acid salts, bromide salts, iodide salts, and fluoride salts of metal); organic metal salts such as acetic salts; hydrates of the metal salts; and hydrates of the organic metal salts. For example, in order to dope graphite with atoms of iron, the metal compound preferably includes iron chloride (III). In order to dope graphite with atoms of cobalt, the metal compound preferably includes cobalt chloride. In order to dope graphite with atoms of manganese, the metal compound preferably includes manganese acetate.

An amount of the metal compound used is appropriately selected. For example, the amount thereof is selected so that a percentage of atoms of the metal to the graphite preferably falls within a range of 5 mass % to 30 mass %, and more preferably falls within a range of 5 mass % to 20 mass %.

As described above, the non-metal containing compound is a compound of the non-metal including at least one of nitrogen, boron, sulfur, and phosphorus. The non-metal containing compound includes at least one compound selected from a group consisting of pentaethylenehexamine, ethylenediamine, tetraethylenepentamine, triethylenetetramine, ethylenediamine, octyl boronic acid, and 1,2-bis(diethylphosphoinoethane), triphenyl phosphite, and benzyl disulfide.

It is particularly preferable that the non-metal containing compound contain a compound capable of forming a complex with an atom of the metal that is to be added to the graphite as a dopant. In this case, the catalytic activity of the carbon-based material is further improved. The reason is assumed as follows. When the compound capable of forming a complex with an atom of the metal is used, the graphite may be more likely to be doped with the non-metal atom after transient formation of a complex of the atom of the metal derived from the metal compound and the non-metal containing compound in a step of doping. As a result, in the carbon-based material, the atoms of the metal and the non-metal are coordinated to each other. In this regard, the catalytic activity may occur at a position where atoms of the non-metal and the metal of the carbon-based material are close to each other. Hence, the catalytic activity of the carbon-based material may be further improved by using the non-metal containing compound allowing the formation of a complex with an atom of the metal.

As described above, according to the measurement results of the carbon-based material by cyclic voltammetry, the redox potential shifts depending on a type of the non-metal which is contained in the carbon-based material as a dopant. This shift of the redox potential may be caused by a change in an electron state of the metal due to the coordinate bond between atoms of the metal and the non-metal. In other words, when there is the shift in the redox potential of the carbon-based material, it can be determined that atoms of the non-metal and the metal which are contained in the carbon-based material as dopants are coordinated to each other.

The molecular weight of the non-metal compound is preferably equal to or less than 800. In this case, graphite is easily doped with an atom of the non-metal derived from the non-metal compound. This may be because the molecular weight of the non-metal compound is small, and therefore the non-metal containing compound is thermally decomposed in a short time to produce an atom of the non-metal, and as a result, the graphite is rapidly doped with the resultant atom of the non-metal.

The non-metal compound preferably contains at least one particularly selected from pentaethylenehexamine, ethylenediamine, tetraethylenepentamine, triethylenetetramine, and ethylenediamine, as the compound capable of forming a complex with an atom of the metal. In this case, the carbon-based material has remarkably high catalytic activity.

An amount of the non-metal containing compound used is also appropriately selected in accordance with a desirable amount of dopant atoms of the non-metal in the graphene. For example, the amount of the non-metal containing compound is preferably selected so that a molar ratio of atoms of the metal of the metal compound to atoms of the non-metal of the non-metal containing compound preferably falls within a range of 1:1 to 1:2, and more preferably falls within a range of 1:1.5 to 1:1.8.

The mixture is obtained in the following manner, for example. First, the graphite, the metal compound, and the non-metal compound are mixed, and a solvent such as ethanol may be added as requested in order to adjust the total amount of this mixture. The resultant mixture is dispersed by ultrasonically dispersion, followed by drying by application of heat at an appropriate temperature (e.g., 60° C.). Consequently, obtained is a mixture of the metal compound, the non-metal containing compound, and the graphite.

Thereafter, thus-obtained mixture is heated. Heating the mixture is conducted by an appropriate method. For example, the heating may be conducted under reducing atmosphere or inert atmosphere. Consequently, the graphite is doped with atoms of the non-metal, and in addition, the graphite is doped with atoms of the metal by making a coordinate bond of atoms of the non-metal and the metal. The heating temperature for this heat treatment falls within a range of 800° C. to 1000° C., and the heating time is 45 sec or more but less than 600 sec. Since the heating time is short as described above, the carbon-based material is prepared efficiently, and in addition, the catalytic activity of the carbon-based material is further improved.

Besides, regarding this heat treatment, a heating rate at the start of the heating the mixture is preferably 50° C./s or more. When the mixture is rapidly heated as described above, the catalytic activity of the carbon-based material is further improved. This may be because the amounts of the inactive metal compound and the metal crystal in the carbon-based material are further decreased.

In addition, thus-obtained carbon-based material may be further subjected to acid wash. For the acid wash, the carbon-based material is dispersed in pure water with a homogenizer at 30 min and thereafter the resultant carbon-based material is added into 2 M sulfuric acid and stirred at 80° C. for three hours, for example. Regarding the catalytic performance of the carbon-based material subjected to such acid wash, a great improvement on overpotential is not found when used as a catalyst, but elution of a metal component from the carbon-based material is suppressed, compared with those of a carbon-based material without being subjected to the acid wash.

According to the manufacturing method as described above, it is possible to obtain the carbon-based material which contains markedly little the inactive metal compound and the metal crystal, and has high electrical conductivity.

Then, the carbon-based material of the second embodiment will be described. A binding energy spectrum of the carbon-based material of the present embodiment obtained by X-ray photoelectron spectroscopy shows a peak derived from a is orbital of a carbon atom. Besides, an intensity of a (002) peak in an X-ray diffraction pattern of the carbon-based material of the present embodiment is preferably less than ten times as high as the intensity of the (002) peak of the X-ray diffraction pattern of ketjenblack "EC300J" (product name) available from Lion Corporation. In addition, a spherical cluster or an aggregate thereof is mainly found in observation of the carbon-based material with a transmission electron microscope (TEM). The "spherical cluster" refers to a cluster having an aspect ratio in any cross-section ranging from 0.01 to 1.

The carbon-based material of the present embodiment is obtained by doping amorphous carbon particles with atoms of the non-metal and the metal, for example. In other words, the carbon-based material of the present embodiment is mainly made of the amorphous carbon particles and prepared by doping the amorphous carbon particles with atoms of the non-metal and the metal, for example.

According to this configuration, readily available amorphous carbon particles can be used as the carbon source material to prepare the carbon-based material of the present embodiment. Therefore, it is possible to easily obtain the carbon-based material.

The non-metal contained in the carbon-based material as a dopant includes at least one of nitrogen, boron, and phosphorus.

The metal contained in the carbon-based material as a dopant is not particularly limited, but preferably includes at least one type of metal selected from titanium (Ti), vanadium (V), chromium (Cr), manganese (Mn), iron (Fe), cobalt (Co), nickel (Ni), cupper (Cu), zirconium (Zr), niobium (Nb), molybdenum (Mo), ruthenium (Ru), rhodium (Rh), palladium (Pd), silver (Ag), hafnium (Hf), tantalum (Ta), tungsten (W), rhenium (Re), osmium (Os), iridium (Ir), platinum (Pt), and gold (Au). In this case, the carbon-based material shows excellent performance particularly as a catalyst to promote an oxygen reduction reaction. The amount of dopant atoms of the metal contained in the carbon-based material may be arbitrarily selected so that the carbon-based material shows excellent catalytic performance.

As described above, the non-metal contained in the carbon-based material as a dopant includes at least one of nitrogen, boron, and phosphorus. An amount of dopant atoms the non-metal in the carbon-based material may be arbitrarily selected so that the carbon-based material shows excellent catalytic performance.

In the present embodiment, atoms of the non-metal and the metal may be mainly present in a surface layer of the carbon-based material. This may because, in a step of doping amorphous carbon particles with atoms of the metal and the non-metal in the process for producing the carbon-based material, it is not easy for the atoms of the metal and the non-metal to intrude into the inside of amorphous carbon particles, and these atoms may be mainly added into the surface layer of the amorphous carbon particles as dopants. Accordingly, the carbon-based material may include a core layer substantially consisting of the amorphous carbon particles, and a doped layer covering the core layer and containing atoms of the non-metal and the metal.

According to the measurement result (voltammogram) of the carbon-based material of the present embodiment obtained by cyclic voltammetry, the voltammogram shows a peak derived from a redox reaction involving an atom (ion) of the metal which is contained in the carbon-based material as a dopant. In other words, presence of an atom of the metal in the carbon-based material can be confirmed, based on presence of the peak derived from the redox reaction involving this atom of the metal. Besides, an average value (redox potential) of a potential at a peak position in the oxidation reaction and a potential at a peak position in the reduction reaction in this voltammogram shifts depending on a type of the non-metal which is contained in the carbon-based material as a dopant. In other words, success of doping with an atom of the non-metal in the carbon-based material is confirmed, based on the value of the redox potential or an amount of the shift. In addition, since an electrochemical reaction on the carbon-based material occurs on a surface of the carbon-based material, it is determined that the atoms of the metal and the non-metal are present in the surface layer of the carbon-based material.

The carbon-based material of the present embodiment does not contain particles having a diameter of 1 nm or more and containing at least one of the inactive metal compound and the metal crystal. It is particularly preferable that the carbon-based material contain no particle containing at least one of the inactive metal compound and the metal crystal, irrespective of its diameter. Accordingly, the carbon-based material of the present embodiment shows high catalytic activity.

Besides, in the present embodiment, when an atom of the metal which is not platinum is contained in the carbon-based material as a dopant, it is sufficient that, in the radial distribution function obtained by Fourier transform of the K-edge EXAFS of the metal, the ratio of "A" to "B" is equal to or more than 4.0, irrespective of whether or not the carbon-based material contains particles having a diameter of 1 nm or more and containing at least one of the inactive metal compound and the metal crystal, wherein "A" denotes an intensity of the highest one of peaks around a distance equal to a coordinate bond length between atoms of the metal and the non-metal and "B" denotes an intensity of the highest one of peaks around a distance equal to a metallic bond length between atoms of the metal. Also in this case, the carbon-based material of the present embodiment shows high catalytic activity. It is particularly preferable that the carbon-based material do not contain any particles having a diameter of 1 nm or more and containing at least one of the inactive metal compound and the metal crystal, and the ratio of "A" to "B" be equal to or more than 4.0.

Altetively, in the present embodiment, when platinum is contained in the carbon-based material as a dopant, in the radial distribution function obtained by Fourier transform of the LIII-edge EXAFS of the platinum, the ratio of "A" to "B" may be equal to or more than 4.0, irrespective of whether or not the carbon-based material contains particles having a diameter of 1 nm or more and containing at least one of the inactive metal compound and the metal crystal, wherein "A" denotes an intensity of the highest one of peaks around a distance equal to a coordinate bond length between atoms of the platinum and the non-metal and "B" denotes an intensity of the highest one of peaks around a distance equal to a metallic bond length between atoms of the platinum. Also in this case, the carbon-based material of the present embodiment shows high catalytic activity. It is particularly preferable that the carbon-based material do not contain any particles having a diameter of 1 nm or more and containing at least one of the inactive metal compound and the metal crystal, and the ratio of "A" to "B" be equal to or more than 4.0.

Note that, as described above, a range of "around a distance equal to a coordinate bond length" preferably refers to a range from the coordinate bond length minus 0.3 Å to the coordinate bond length plus 0.3 Å. Particularly when the metal is iron and the non-metal is nitrogen, the range of around the distance equal to the coordinate bond length preferably refers to a range of 1.5±0.1 Å. When the metal is iron and the non-metal is boron, the range of around the distance equal to the coordinate bond length preferably refers to a range of 2.4±0.2 Å. When the metal is iron and the non-metal is sulfur, the range of around the distance equal to the coordinate bond length preferably refers to a range of 2.3±0.2 Å. When the metal is iron and the non-metal is phosphorus, the range of around the distance equal to the coordinate bond length preferably refers to a range of 3.1±0.3 Å. When the metal is cobalt and the non-metal is nitrogen, the range of around the distance equal to the coordinate bond length preferably refers to a range of 1.4±0.2 Å. When the metal is cobalt and the non-metal is sulfur, the range of around the distance equal to the coordinate bond length preferably refers to a range of 2.3±0.2 Å. When the metal is cobalt and the non-metal is phosphorus, the range of around the distance equal to the coordinate bond length preferably refers to a range of 2.3±0.2 Å. When the metal is manganese and the non-metal is nitrogen, the range of around the distance equal to the coordinate bond length preferably refers to a range of 2.1±0.3 Å. When the metal is manganese and the non-metal is sulfur, the range of around the distance equal to the coordinate bond length preferably refers to a range of 2.4±0.2 Å. When the metal is platinum and the non-metal is nitrogen, the range of around the distance equal to the coordinate bond length preferably refers to a range of 2.0±0.2 Å.

In addition, as described above, a range of "around a distance equal to a metallic bond length" preferably refers to a range from the metallic bond length minus 0.3 Å to the metallic bond length plus 0.3 Å. Particularly when the metal is iron, the range of around the distance equal to the metallic bond length preferably refers to a range of 2.1±0.1 Å. When the metal is cobalt, the range of around the distance equal to the metallic bond length preferably refers to a range of 2.2±0.2 Å. When the metal is manganese, the range of around the distance equal to the metallic bond length preferably refers to a range of 2.7±0.3 Å. When the metal is platinum, the range of around the distance equal to the metallic bond length preferably refers to a range of 2.8±0.2 Å.

Besides, in the carbon-based material of the present embodiment, it is preferable that the molar ratio of atoms of the metal to atoms of carbon determined by XPS be less than 0.01, and the molar ratio of atoms of the non-metal to atoms of the carbon is less than 0.05. In this case, amounts of the metal and the non-metal are small in the predetermined region of the surface layer of the carbon-based material, and therefore it may be determined that amounts of dopant atoms of the metal and the non-metal in the carbon-based material are small. The molar ratio of atoms of the metal to atoms of the carbon is particularly preferably 0. Note that these molar ratios are only values determined by XPS measurement. Therefore, even when these values are zero, amounts of atoms of the metal and the non-metal in the surface layer of the carbon-based material may not be zero, practically. Presence of atoms of the metal and the non-metal is confirmed based on measurement results obtained by cyclic voltammetry of the carbon-based material, as described above.

It is preferable that the carbon-based material of the present embodiment include the doped layer containing atoms of the non-metal and the metal as the outermost layer, and a layer inside the doped layer substantially consist of amorphous carbon. In this case, since the layer inside the doped layer substantially consists of amorphous carbon, electrical conductivity of the carbon-based material is less likely to be inhibited.

It is preferable that an X-ray diffraction pattern of the carbon-based material show that a proportion of an intensity of the highest one of peaks derived from the inactive metal compound and the metal crystal to an intensity of the (002) peak is not more than 0.1. In this case, the percentages of the inactive metal compound and the metal crystal in the carbon-based material are remarkably small. The proportion in intensity of peak is preferably smaller. It is particularly preferable that the peaks derived from the inactive metal compound and the metal crystal be not found in the X-ray diffraction pattern.

Note that, in X-ray diffraction measurement of the carbon-based material of the present embodiment, it is preferable that a sample to be measured contain only the carbon-based material and do not contain a substance independently present from the carbon-based material such as a substance contaminated in the carbon-based material and a substance attached to the carbon-based material. Therefore, prior to the X-ray diffraction measurement of the carbon-based material, it is required to sufficiently decrease the amount of the substance which is independently present from the carbon-based material by, for example, washing with an aqueous acid solution.

The carbon-based material of the present embodiment shows excellent catalytic performance, when used as the electrode catalyst, as described above. In particular, when used as the oxygen reduction catalyst or the oxygen evolution catalyst, the carbon-based material shows excellent catalytic performance.

A combination of the metal and the non-metal which are contained in the carbon-based material as dopants are appropriately selected. Particularly when the carbon-based material is used as the oxygen reduction electrode catalyst, it is preferable that the non-metal include nitrogen and the metal includes iron. In this case, the carbon-based material can show remarkably excellent catalytic activity. The non-metal may be nitrogen itself and the metal may be iron itself.

When the carbon-based material is applied to the oxygen evolution electrode, it is preferable that the non-metal include nitrogen, and the metal include at least one of cobalt and manganese. In this case, the carbon-based material can show remarkably excellent catalytic activity. The non-metal may be nitrogen itself. The metal may be cobalt or manganese itself, or a combination of cobalt and manganese.

The average primary particle size of the carbon-based material is preferably equal to or less than 100 nm, and is more preferably equal to or less than 60 nm. In these cases, a surface area of the carbon-based material is remarkably increased, and accordingly the number of active sites when the carbon-based material is used as a catalyst is increased. Therefore, the catalytic activity of the carbon-based material is improved. Besides, the primary particle size of the carbon-based material is preferably equal to or less than 100 nm. In this case, the number of active sites when the carbon-based material is used as a catalyst is more increased, and therefore the catalytic activity of the carbon-based material is more improved. Note that the primary particle size of the carbon-based material refers to a diameter of primary particles converted into a true circle determined by image-processing an image of the carbon-based material taken with an electron microscope. The average primary particle size is an arithmetic mean value of the primary particles averaged on the basis of the number thereof.

When the carbon-based material is used as the electrode catalyst, the carbon-based material is supported on an electrode, for example. In this case, the electrode on which the catalyst containing the carbon-based material is provided is easily formed.

Then, the process for producing a carbon-based material of the second embodiment will be described. The process for producing a carbon-based material of the present embodiment includes steps of: preparing a mixture of the non-metal containing compound, the metal compound, and the amorphous carbon particles, the non-metal containing compound containing non-metal including at least one of nitrogen, boron, sulfur, and phosphorus; and heating the mixture to a temperature ranging from 800° C. to 1000° C. for a time of 30 sec or more but less than 300 sec.

The process for producing the carbon-based material of the present embodiment will be described more specifically.

Among the starting materials, the amorphous carbon particles serving as the carbon source material are not particularly limited so long as they have relatively low crystallinity. Examples of the amorphous carbon particles include particles of carbonblack such as vulcan XC-72R, acetylene black, ketjenblack, fuce black, and denka black.

An intensity of a (002) peak in a X-ray diffraction pattern of amorphous carbon particles is preferably less than ten times as high as an intensity of a (002) peak of the X-ray diffraction pattern of ketjenblack "EC300J" (product name) available from Lion Corporation. Besides, a spherical cluster or an aggregate thereof is mainly found in observation of the amorphous carbon particles with a transmission electron microscope (TEM). The spherical cluster refers to a cluster having an aspect ratio in any cross-section ranging from 0.01 to 10.

The average primary particle size of the amorphous carbon particle is preferably equal to or less than 100 nm, and is more preferably equal to or less than 60 nm. In these cases, a surface area of the carbon-based material is remarkably increased, and accordingly the number of active sites when the carbon-based material is used as a catalyst is increased. Therefore, the catalytic activity of the carbon-based material is improved. Besides, the primary particle size of the amorphous carbon particle is preferably equal to or less than 100 nm. In this case, the surface area of the carbon-based material is remarkably increased, and accordingly the number of active sites when the carbon-based material is used as a catalyst is more increased, and therefore the catalytic activity of the carbon-based material is more improved. Note that the primary particle size of the amorphous carbon particle refers to a diameter of primary particles converted into a true circle determined by image-processing an image of the amorphous carbon particle taken with an electron microscope. The average primary particle size is an arithmetic mean value of the primary particles averaged on the basis of the number thereof.

The metal compound is not particularly limited so long as it contains metal capable of coordinating to an atom of the non-metal with which the amorphous carbon particles are to be doped. Examples of the metal compound include: inorganic metal salts (e.g., chloride salts, nitrate salts, sulfate salts, bromide salts, iodide salts, and fluoride salts of metal), organic metal salts such as acetic salts; hydrates of the metal salts; and hydrates of the organic metal salts. For example, in order to dope the amorphous carbon particles with atoms of iron, the metal compound preferably includes iron chloride (III). In order to dope the amorphous carbon particles with atoms of cobalt, the metal compound preferably includes cobalt chloride. In order to make a coordination of atoms of the non-metal and manganese, the metal compound preferably includes manganese acetate.

An amount of the metal compound used is appropriately selected. For example, the amount is selected so that a percentage of atoms of the metal to the amorphous carbon particles preferably falls within a range of 5 mass % to 30 mass %, and more preferably falls within a range of 5 mass % to 20 mass %.

The non-metal containing compound is a compound of the non-metal including at least one of nitrogen, boron, sulfur, and phosphorus, as described above. The non-metal containing compound includes at least one compound selected from a group consisting of pentaethylenehexamine, ethylenediamine, tetraethylenepentamine, triethylenetetramine, ethylenediamine, octyl boronic acid, and 1,2-bis (diethylphosphoinoethane), triphenyl phosphite, and benzyl disulfide.

It is particularly preferable that the non-metal containing compound contain a compound capable of forming a complex with an atom of the metal that is to be added to the amorphous carbon particles as a dopant. In this case, the catalytic activity of the carbon-based material is further improved. The reason is assumed as follows. When the non-metal containing compound capable of forming a complex with an atom of the metal is used, the amorphous carbon particles may be more likely to be doped with an atom of the non-metal after transient formation of a complex of the atom of the metal derived from the metal compound and the non-metal containing compound in a step of doping. As a result, in the carbon-based material, the atoms of the metal and the non-metal are coordinated to each other. In this regard, the catalytic activity may occur at a position where atoms of the non-metal and the metal of the carbon-based material are close to each other. Hence, the catalytic activity of the carbon-based material may be further improved by using the non-metal containing compound capable of forming a complex with an atom of the metal.

As described above, according to the measurement results of the carbon-based material by cyclic voltammetry, the redox potential shifts depending on a type of the non-metal which is contained in the carbon-based material as a dopant. This shift of the redox potential may be caused by a change in an electron state of an atom of the metal due to the coordinate bond between atoms of the metal and the non-metal. In other words, when there is a shift in the redox potential of the carbon-based material, it can be determined that atoms of the non-metal and the metal which are contained in the carbon-based material as dopants are coordinated to each other.

The molecular weight of the non-metal compound is preferably equal to or less than 800. In this case, an atom of the non-metal derived from the non-metal compound is easily added into the amorphous carbon particles. This may be because the molecular weight of the non-metal compound is small, therefore the non-metal containing compound is thermally decomposed in a short time to produce a metal of the non-metal, and as a result, the amorphous carbon particles are rapidly doped with thus-obtained atom.

The non-metal compound preferably contains particularly at least one selected from pentaethylenehexamine, ethylenediamine, tetraethylenepentamine, triethylenetetramine, and ethylenediamine, as a compound capable of forming a complex with an atom of the metal. In this case, the carbon-based material has remarkably high catalytic activity.

An amount of the non-metal containing compound used is also appropriately selected in accordance with a desirable amount of dopant atoms of the non-metal with which the amorphous carbon particles are doped. For example, the amount of the non-metal containing compound is preferably selected so that a molar ratio of atoms of the metal of the metal compound to atoms of the non-metal of the non-metal containing compound preferably falls within a range of 1:1 to 1:2, and more preferably falls within a range of 1:1.5 to 1:1.8.

The mixture is obtained in the following manner, for example. First, the amorphous carbon particles, the metal compound, and the non-metal compound are mixed, and a solvent such as ethanol may be added as requested in order to adjust the total amount of this mixture. This mixture is dispersed by ultrasonically dispersion, followed by drying by application of heat at an appropriate temperature (e.g., 60° C.). Consequently, obtained is a mixture of the metal compound, the non-metal containing compound, and the amorphous carbon particles.

Thereafter, thus-obtained mixture is heated. Heating the mixture is conducted by an appropriate method. For example, the heating may be conducted under reducing atmosphere or inert atmosphere. Accordingly, the amorphous carbon particles are doped with atoms of the non-metal, and also doped with atoms of the metal by making a coordinate bond of atoms of the non-metal and the metal. The heating temperature for this heat treatment falls within a range of 800° C. to 1000° C., and the heating time is 30 sec or more but less than 300 sec. Since the heating time is short as described above, the carbon-based material is prepared efficiently, and in addition, the catalytic activity of the carbon-based material is further improved.

Besides, regarding this heat treatment, a heating rate at the start of the heating the mixture is preferably 50° C./s or more. When the mixture is rapidly heated as described above, the catalytic activity of the carbon-based material is further improved. This may be because the amounts of the inactive metal compound and the metal crystal in the carbon-based material are further decreased.

In addition, thus-obtained carbon-based material may be further subjected to acid wash. For example, for the acid wash, the carbon-based material is dispersed in pure water with a homogenizer for 30 min and thereafter the resultant carbon-based material is immersed in 2 M sulfuric acid at 80° C. for three hours under stirring conditions. Regarding the catalytic performance of the carbon-based material subjected to such acid wash, a great change in overpotential is not observed when used as a catalyst, but elution of a metal component from the carbon-based material is suppressed, compared with those of a carbon-based material without being subjected to the acid wash.

According to the manufacturing method as described above, it is possible to obtain the carbon-based material which contains markedly little the inactive metal compound and the metal crystal and has high electrical conductivity.

Since the carbon-based materials of the first and second embodiments have high catalytic activity as well as high electrical conductivity, the carbon-based materials are particularly suitable for use as a catalyst (namely, electrode catalyst) for electrochemically causing a chemical reaction to proceed at an electrode. Furthermore, the carbon-based materials are suitable for use as a catalyst (namely, oxygen reduction electrode catalyst) for making the oxygen reduction reaction proceed at the electrode and as a catalyst (namely, oxygen evolution electrode catalyst) for making the oxygen evolution reaction proceed at the electrode. Moreover, the carbon-based materials are particularly suitable for use as a catalyst applied to a gas diffusion electrode for reducing gaseous oxygen.

With regard to the case of applying the carbon-based materials of the first and second embodiments to a catalyst of a gas diffusion electrode, a configuration example of the gas diffusion electrode will be described.

This gas diffusion electrode includes: the carbon-based material as an electrode catalyst; and a carrier for carrying the carbon-based material. The carrier has electrical conductivity. The gas diffusion electrode may further include a support as requested.

It is sufficient that the carbon-based material is provided at least partially on a surface of the gas diffusion electrode so that a redox reaction involving reaction gas, electron donating microbes or the like can proceed on the gas diffusion electrode.

The carrier has electrical conductivity and is capable of carrying the carbon-based material which functions as the catalyst. A material of the carrier is not particularly limited so long as the electrically conductive carrier has these properties. Examples of the material of the carrier include a carbon-based substance, an electrically conductive polymer, a semiconductor, and metal.

The carbon-based substance is a substance containing carbon as a constituent. Examples of the carbon-based substance include graphite, activated carbon, carbon powder (e.g., carbon black, vulcan XC-72R, acetylene black, fuce black, denka black), carbon fibers (e.g., graphite felt, carbon wool, and carbon fabric), carbon plates, carbon paper, and carbon disks. In addition, the carbon-based substance may be a substance with a microstructure such as carbon nanotube, carbon nanohorn, and carbon nano clusters.

The electrically conductive polymer is a generic name of polymer compounds with electrical conductivity. The electrically conductive polymer may be a polymer composed of a single type or two or more types of monomers as a structure unit. Example of the monomer may include aniline, aminophenol, diaminophenol, pyrrol, thiophene, paraphenylene, fluorene, furan, acetylene, and the derivative thereof. Specific examples of the electrically conductive polymer include polyaniline, polyaminophenol, poly(diaminophenol), polypyrrol, polythiophene, polyparaphenylene, polyfluorene, polyfuran, and polyacetylene.

In view of availability, cost, corrosion resistance, and durability, the carrier is preferably the carbon-based substance, but may not be. The carrier which is porous can serve as a gas diffusion layer. At the gas diffusion layer, a gas-liquid interface is formed.

The carrier may be composed of a single type or a combination of two types or more of substances. For example, used may be a carrier composed of a combination of the carbon-based substance and the electrically conductive polymer, or a carrier composed of a combination of carbon powder and carbon paper which are the carbon-based substances.

A form of the carrier is not particularly limited so long as the carrier can carry the carbon-based material which functions as the catalyst on a surface of the carrier. In view of improving catalytic activity per unit mass (mass activity) of the gas diffusion electrode, the carrier is preferably in fiber form so that the carrier has a great specific surface area per unit mass. This is because a greater specific surface area of the catalyst can generally ensure a greater carrying area and improve dispersibility of catalytic components on a surface of the carrier. Therefore, a microfiber form like carbon fibers is suitable for the form of the carrier.

The carrier has a part serving as a connection terminal to be connected to a conductive wire which interconnects a fuel cell electrode and an extel circuit.

The support is defined as a material that is rigid and allows the gas diffusion electrode to have a fixed shape. In a case where the carrier is in powder form or the like, the carrier carrying the carbon-based material alone cannot allow the gas diffusion electrode to have a fixed shape. Altetively, in a case where the carrier is in the form of a thin layer, the carrier does not have rigidity by itself. In these cases, the carrier which carries the carbon-based material is provided on a surface of the support so that the electrode has a fixed shape and rigidity.

The gas diffusion electrode may include the support as requested. For example, in a case where the carrier has a fixed shape and rigidity by itself like a carbon disk, the carrier carrying the carbon-based material can alone maintain the shape of the gas diffusion electrode. In other cases, an electrolyte member alone can allow the gas diffusion electrode to have a fixed shape and rigidity. In PEFC, for example, thin layer electrodes are individually provided on opposite faces of a solid polymer electrolyte membrane. In this case, the support is not necessarily required.

A material of the support is not particularly limited so long as it has such rigidity that the electrode can have a fixed shape. Moreover, the support may be an insulator or an electrical conductor. Examples of the support that is an insulator include: glass; plastic; synthetic rubber; ceramics; paper and plant chips (e.g., wood chips) subjected to water-repellent treatment or water-proof treatment; and animal chips (e.g., bone chips, shells, and sponges). The support preferably has a porous structure. This is because the support with a porous structure has an increased specific surface area to receive the electrically conductive carrier which carries the carbon-based material, and therefore allows an increase in mass activity of the electrode. Examples of the support with a porous structure include porous ceramics, porous plastics, and the animal chips. Examples of the support that is an electrical conductor include carbon-based substances (e.g., carbon paper, carbon fibers, and carbon rods), metal, and an electrically conductive polymer. In a case where the support is an electrical conductor, the carrier carrying the carbon-based material is provided on a surface of the support, and the support may also serve as a current collector.

When the gas diffusion electrode includes the support, the shape of the gas diffusion electrode is usually determined based on the shape of the support. The shape of the support is not particularly limited so long as the gas diffusion electrode functions as an electrode. The shape of the support may be selected appropriately in accordance with the shape or the like of the fuel cell. For example, the support may have a shape of a (approximate) plate (e.g., thin layer), a (approximate) prism, a (approximate) sphere, or a combination thereof.

A method of making the carrier carry the carbon-based material functioning as the catalyst may be a known method in the field. For example, available is a method of binding the carbon-based material on the surface of the carrier with an appropriate binder. The binder preferably has electrical conductivity but may not. For example, the binder may be an electrically conductive polymer solution which contains an appropriate solvent and an electrically conductive polymer dissolved therein, a dispersion of polytetrafluoroethylene (PTFE), or the like. The carbon-based material may be carried on the electrically conductive carrier by applying or spraying such a binder onto the surface of the electrically conductive carrier and/or a surface of the electrode catalyst for combining the carbon-based material with the electrically conductive carrier and thereafter drying the binder. Altetively, the carbon-based material may be carried on the electrically conductive carrier by immersing the electrically conductive carrier into the binder solution including the carbon-based material, and thereafter drying the binder solution. In this case, it is preferable to use the carbon-based material having a particle shape.

A method of preparing the gas diffusion electrode may be a known method in the field. For example, the gas diffusion electrode may be prepared by mixing the carrier which carries the carbon-based material functioning as the catalyst, with a dispersion of PTFE (e.g., Nafion (registered trademark; Du pont Kabushiki Kaisha) solution) or the like to prepare a mixture liquid, forming the mixture liquid into an appropriate shape, and heating it. With regard to PEFC and PAFC, the electrode is on a surface of the solid polymer electrolyte membrane or an electrolyte matrix layer. In this case, the electrode may be formed by: preparing an electrode sheet by forming the mixture liquid into a shape of a sheet; coating or impregnating a face, to be bonded to a membrane, of the electrode sheet with a solution of the fluorine resin-based ion exchange membrane having proton conductivity or the like; and bonding the fluorine resin-based ion exchange membrane to the electrode sheet by hot press, for example. The fluorine resin-based ion exchange membrane having proton conductivity may be Nafion, Filemion (registered trademark, available from ASAHI GLASS CO., LTD.), or the like.

Altetively, the gas diffusion electrode may be prepared by applying a mixture slurry of the mixture liquid onto a surface of the support having electrical conductivity such as carbon paper, and thereafter heating them.

Altetively, the gas diffusion electrode may be prepared by applying a mixture ink or a mixture slurry of the electrically conductive carrier carrying an electrode catalyst and a solution of a proton-conducting ion exchange membrane (e.g., Nafion solution) onto the surface of the support, the solid polymer electrolyte membrane, the electrolyte matrix layer, or the like.

FIG. 1 shows an example of a structure of a gas diffusion electrode 11. This gas diffusion electrode 11 includes: a carrier 2 which has electrical conductivity and is porous; and an electrode catalyst 3 carried on the carrier 2. The electrode catalyst 3 is composed of the carbon-based material having the particle shape. The electrode catalyst 3 is carried on the carrier 2 with a binder 4. Note that, in FIG. 1, a reference sign 5 denotes the core layer of the carbon-based material and a reference sign 6 denotes the doped layer of the carbon-based material.

In the gas diffusion electrode, the porous carbon-based material of the first embodiment having a sheet shape may be used instead of the carrier. For example, the gas diffusion electrode may be composed of: the porous carbon-based material having the sheet shape; and a support to support the carbon-based material. In this case, it is possible to easily obtain an electrode including a catalyst by use of the carbon-based material as a structural member to compose the electrode. Besides, gas is diffused into pores of the carbon-based material, and as a result, a gas-liquid interface is formed at the carbon-based material. The carbon-based material in this state serves as an electrode catalyst, and therefore reaction activity of an electrochemical reaction on the gas diffusion electrode is remarkably improved.

Figure 2:
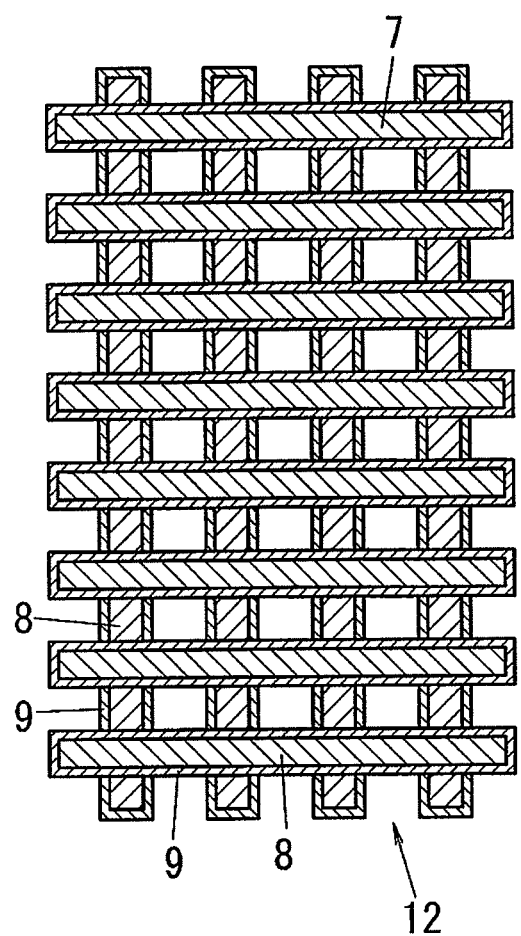
FIG. 2 is a cross-section of an example of a gas diffusion electrode of an embodiment of the present invention.

FIG. 2 shows an example of a structure of a gas diffusion electrode 12 including a carbon-based material 7 which has a sheet shape and is porous. In this case where the carbon-based material 7 which has a sheet shape and is porous is used, the gas diffusion electrode 12 may consist of this carbon-based material 7 alone. Note that, in FIG. 2, a reference sign 8 denotes the core layer of the carbon-based material 7 and a reference sign 9 denotes the doped layer of the carbon-based material 7.

When the gas diffusion electrode includes a carbon-based material which has the sheet shape and is porous, the carbon-based material may serve as a carrier, and an electrode catalyst may be supported on the carrier composed of this carbon-based material. In this case, the reaction activity of an electrochemical reaction on the gas diffusion electrode is further improved. The electrode catalyst is not particularly limited. When the carbon-based material having the particle shape as the electrode catalyst is supported on the carrier made of the carbon-based material which has a sheet shape and is porous, the reaction activity of an electrochemical reaction on the gas diffusion electrode is remarkably improved.

Note that a configuration of the electrode which includes an electron catalyst containing the carbon-based material is not limited the above-mentioned configuration. For example, the electrode also serving as the electrode catalyst may consist of one particle made of the carbon-based material, for example. In this case, the size of the electrode is remarkably small, and therefore a remarkably small electrochemical device may be realized.

The electrochemical device including the electrode containing the electrode catalyst including the carbon-based material will be described. The electrode such as a gas diffusion electrode containing the electrode catalyst including the carbon-based material may be applied to either an anode or a cathode of various electrochemical devices. Examples of the electrochemical device include a fuel battery, a water electrolysis device, a carbon dioxide permeation device, a brine electrolysis device, and a metal air fuel cell (metal lithium fuel cell). For example, the gas diffusion electrode may be applied to cathodes of the carbon dioxide permeation device, a brine electrolysis device, and the like.

When the electrode catalyst containing the carbon-based material is used as an oxygen reduction electrode catalyst, an electrode containing this electrode catalyst such as a gas diffusion electrode may be used as a cathode of a fuel battery, a cathode of a carbon dioxide permeation device, and a cathode of a brine electrolysis device, and the like, for example. Altetively, when the electrode catalyst containing the carbon-based material is used as an oxygen evolution electrode catalyst, an electrode containing this electrode catalyst such as a gas diffusion electrode, is used as an anode of a water electrolysis device, an anode of a metal air cell, and the like, for example.

A fuel battery including the gas diffusion electrode will be described. Examples of the fuel battery in the present description include: hydrogen fuel cells such as a polymer electrolyte fuel cell (PEFC) and a phosphoric acid fuel cell (PAFC); and microbial fuel cells (MFC).

The hydrogen fuel cell extracts an electrical energy from hydrogen and oxygen by the reverse operation of water electrolysis, and known examples thereof include a PEFC, a PAFC, an alkaline fuel cell (AFC), a molten carbonate fuel cell (MCFC), and a solid oxide fuel cell (SOFC). The fuel battery of the present embodiment is preferably the PEFC or the PAFC. The PEFC is a fuel cell including a proton conducting ion exchange membrane as an electrolyte member, and the PAFC is a fuel cell including phosphoric acid ($H_3PO_4$) penetrating a matrix layer as an electrolyte member.

The fuel battery including the gas diffusion electrode is preferably applied to a hydrogen fuel cell, a MFC, and the like. The fuel battery may have a known configuration of the fuel batteries except for including the gas diffusion electrode that contains the electrode catalyst (oxygen reduction electrode catalyst) including the carbon-based material. For example, the fuel battery may have a configuration disclosed by a document "Nenryoudenchino gijutsu", Institute of electrical engineers of japan and fuel cell power next generation system technology survey ad hoc committee, Ohmsha, H17, or Watanabe, K., *J. Biosei. Bioeng.*, 2008, 106: 528-536.

In the fuel battery, the gas diffusion electrode containing the electrode catalyst which includes the carbon-based material may serve as either an anode (fuel electrode) or a cathode (air electrode). In the hydrogen fuel cell, when the gas diffusion electrode containing the electrode catalyst which includes the carbon-based material is used as the anode, the electrode catalyst in accordance with the present invention included in the electrode catalyses a reaction of $H_2 \rightarrow 2H^+ + 2e^-$ involving hydrogen gas functioning as fuel to donate electrons to the anode. When the gas diffusion electrode containing the electrode catalyst which includes the carbon-based material is used as the cathode, the electrode catalyst catalyses a reaction of $\frac{1}{2}O_2 + 2H^+ + 2e^- \rightarrow H_2O$ involving oxygen gas functioning as oxidant. In contrast, in the MFC, the anode accepts electrons directly from electron donating microbes, and therefore the gas diffusion electrode of the present embodiment is used as a cathode mainly causing the same electrode reaction as in the hydrogen fuel cell.

EXAMPLES

Example 1

Into a container, 3 g of graphite having a particle shape (median diameter: 6 μm), an aqueous solution of 0.1 M iron chloride (III) and an ethanol solution of 0.15 M pentaethylene hexamine were added to prepare a mixture. An amount of the aqueous solution of 0.1 M iron chloride (III) used was selected so that a percentage of atoms of iron to the graphene was 10 mass %. Ethanol was further added to the mixture so that the resultant mixture has a total volume of 9 mL. The resultant mixture was subjected to ultrasonic dispersion, followed by drying with a dryer at 60° C. Consequently, a sample containing graphite, iron chloride (III), and pentaethylene hexamine was obtained.

Thus-obtained sample was placed in an end of a quartz tube, and an atmosphere in the quartz tube was replaced by argon. This quartz tube was inserted in an oven at 900° C., placed for 45 sec, and then withdrawn. The heating rate at the start of heating the sample was adjusted to 300° C./s by adjusting a time of insertion of the quartz tube into the oven to three seconds. Thereafter, the sample was cooled by allowing argon gas to pass through the quartz tube. Consequently, a carbon-based material was obtained.

For acid wash, this carbon-based material was dispersed in pure water with a homogenizer for 30 min, and thereafter the resultant carbon-based material was added into 2 M sulfuric acid and stirred at 80° C. for three hours.

Example 2

The carbon-based material of Example 2 was prepared in the same manner and under the same conditions as those of Example 1 except for using an aqueous solution of 0.1 M cobalt chloride instead of iron chloride as a metal source.

Example 3

The carbon-based material of Example 3 was prepared in the same manner and under the same conditions as those of Example 1 except for using an aqueous solution of 0.1 M manganese chloride instead of iron chloride as a metal source.

Comparative Example 1

In a reactor, 3 g of graphite (Wako, 40 mm), 138 mL of concentrated sulfuric acid, and 3.47 g of potassium nitrate were mixed to prepare a mixture liquid. 12 g of Potassium permanganate was further added slowly thereto, with the reactor being in an ice bath. Subsequently, thus-obtained mixture liquid was stirred at 40° C. for 30 min, and then 240 mL of ion-exchanged water was added thereto, followed by stirring and heating at 90° C. for 1 hour. Thereafter, into the reactor, 600 mL of ion-exchanged water and 18 mL of 30% hydrogen peroxide solution were added to finish the reaction. Then, the resultant mixture liquid was washed with hydrochloric acid and water, followed by removing ions therefrom by dialysis. Furthermore, ultrasonic was applied to the resulting mixture liquid to make graphene oxide separated. Thus-obtained graphene oxide was dried. Then, into 200 mg of the dried graphene oxide, an aqueous solution of 0.1 M iron chloride (III) and an ethanol solution of 0.15 M pentaethylene hexamine were added to prepare a mixture. An amount of the aqueous solution of 0.1 M iron chloride (III) was selected so that a percentage of Fe atoms to graphene was 10 mass %. Ethanol was further added to the mixture so that the resultant mixture has a total volume of 9 mL. The resultant mixture was subjected to ultrasonic dispersion, followed by drying with a dryer at 60° C.

Thus-obtained sample was placed in an end of a quartz tube, and an atmosphere in the quartz tube was replaced by argon. This quartz tube was inserted in an oven at 900° C., placed for 45 sec, and then withdrawn. The heating rate at the start of heating the sample was adjusted to 300° C./s by adjusting a time of insertion of the quartz tube into the oven to three seconds. Thereafter, the sample was cooled by allowing argon gas to pass through the quartz tube. Consequently, a carbon-based material was obtained.

Comparative Example 2

A 2,6-Diaminopyridine monomer (available from Aldrich) and ammonium peroxodisulfate (APS) (available from Wako Pure Chemical Industries, Ltd) used as oxidant were mixed at a molar ratio of the former to the latter being 1:1.5 and stirred. Specifically, 5.45 g of 2,6-diaminopyridine and 1 g of sodium hydroxide were dissolved in 400 mL of distilled water, and thereafter 27.6 g of APS and 100 mL of water were further added thereto. Thus-obtained mixture was stirred for 5 min, and left for 12 hours at room temperature to make a polymerization reaction of 2,6-diaminopyridine proceed. Subsequently, the resultant mixture was centrifuged at 3000 rpm to collect black precipitate. This precipitate was washed with distilled water three times, and thereafter the washed precipitate was dried for several hours at 60° C. under vacuum. Consequently, 2,6-diaminopyridine polymer was obtained.

Then, 5.45 g of 2,6-diaminopyridine polymer and 3.62 g of cobalt nitrate $Co(NO_3)_2$ (available from Wako Pure Chemical Industries, Ltd) were suspended in 150 mL of a water-ethanol (1:1) solution so that a molar ratio of 2,6-diaminopyridine polymer (starting monomer) to cobalt (catalyst metal atom) was 4:1. Similarly, to obtain molar ratios of 2,6-diaminopyridine polymer to cobalt were 6:1, 8:1, and 10:1, amounts of 2,6-diaminopyridine polymer and cobalt nitrate were calculated and 2,6-diaminopyridine polymer and cobalt nitrate were compounded. Thus-obtained suspensions were ultrasonically mixed for 1 hour with a sonicator ultrasonic probe systems (available from AS ONE Corporation), and further stirred for 2 hours at 60° C. to vaporize the solution. Thus-obtained powder of a polymer metal complex of 2,6-diaminopyridine polymer and cobalt was grounded with a quartz crystal mortar.

The polymer metal complex was sintered at 700° C. for 1.5 hour under ammonia gas atmosphere. The resultant sintered metal complex was subjected to ultrasonic acid-wash treatment (pre-leach) for 8 hours with a 12 Normal solution of hydrochloric acid, and an insoluble substance and an inactive substance were removed therefrom, and subsequently the resultant complex was washed with deionized water sufficiently. Finally, the resultant sintered metal complex was collected by filtration and the collected metal complex was dried at 60° C. Consequently, a Co-2,6-diaminopyridine polymer (CoDAPP) catalyst was obtained.

Example 4

Into a container, graphite having a sheet shape with a size of 1 mm×1 mm in a plan view, an aqueous solution of 0.1 M cobalt chloride, and an ethanol solution of 0.15 M pentaethylene hexamine were added to prepare a mixture.

In Example 5, an amount of the aqueous solution of 0.1 M cobalt chloride was selected so that a percentage of atoms of Co to graphite was 30 mass %.

Ethanol was further added to this mixture so that the resultant mixture has a total volume of 9 mL. The resultant mixture was subjected to ultrasonic dispersion, followed by drying with a dryer at 60° C. Consequently, a sample containing the graphite, cobalt chloride, and pentaethylene hexamine was obtained.

The sample was placed in an end of a quartz tube, and an atmosphere in the quartz tube was replaced by argon. This quartz tube was inserted in an oven at 900° C., placed for 45 sec, and then withdrawn. The heating rate at the start of heating the sample was adjusted to 300° C./s by adjusting a time of insertion of the quartz tube into the oven to three seconds. Thereafter, the sample was cooled by allowing argon gas to pass through the quartz tube. Consequently, a carbon-based material was obtained.

Example 5

An aqueous solution of 0.1 M manganese acetate was used instead of the aqueous solution of 0.1 M cobalt chloride in Example 4. In Example 5, an amount of an aqueous solution of 0.1 M manganese acetate was adjusted so that a percentage of atoms of manganese to graphite was 30 mass %.

The carbon-based material of Example 5 was prepared under the same conditions as that in Example 4.

[Evaluation of an Amount of Impurity]

Figure 3A:
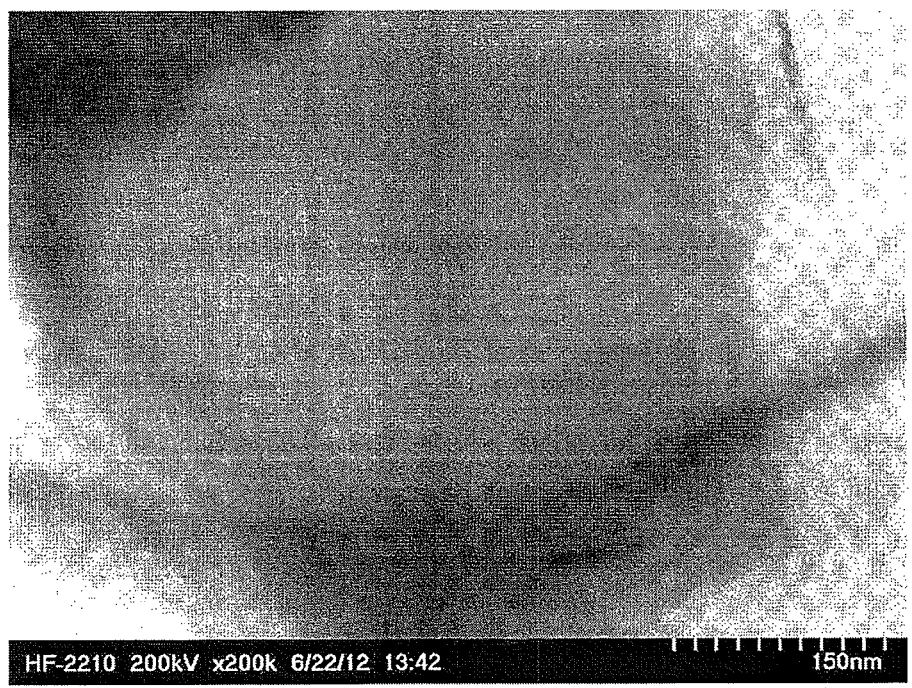
FIG. 3A is an transmission electron micrograph of a carbon-based material of Example 1.
Figure 3B:
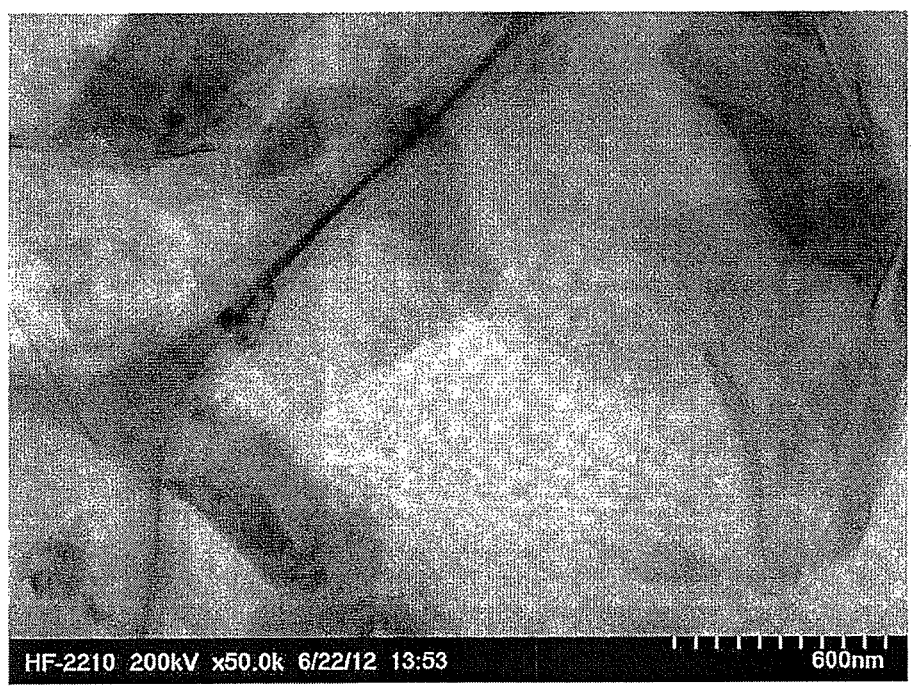
FIG. 3B is an transmission electron micrograph of the carbon-based material of Example 1.

The carbon-based materials of Examples 1 to 5 were observed with a transmission electron microscope. For this observation with the transmission electron microscope, the carbon-based material was dispersed on a microgrid made of Cu, and the observation was conducted under conditions where an accelerating voltage was 300 kV. As a result, regarding all of the carbon-based materials, presence of a particle containing at least one of the inactive metal compound and the metal crystal was not confirmed. FIGS. 3A and 3B show an image of the carbon-based material of Example 1 taken with a transmission electron microscope.

[XPS Measurement]

XPS measurement of the carbon-based materials of Examples 1 to 5 was conducted by use of a characteristic X-ray of Al as a beam under vacuum of $3 \times 10^{-8}$ Pa. For the measurement, the carbon-based material was fixed with a press to an In foil. As a result, regarding all of the Examples, the ratio of atoms of the metal to atoms of the carbon was less than 0.01, and the ratio of atoms of the non-metal to atoms of the carbon was less than 0.05.

Figure 4:
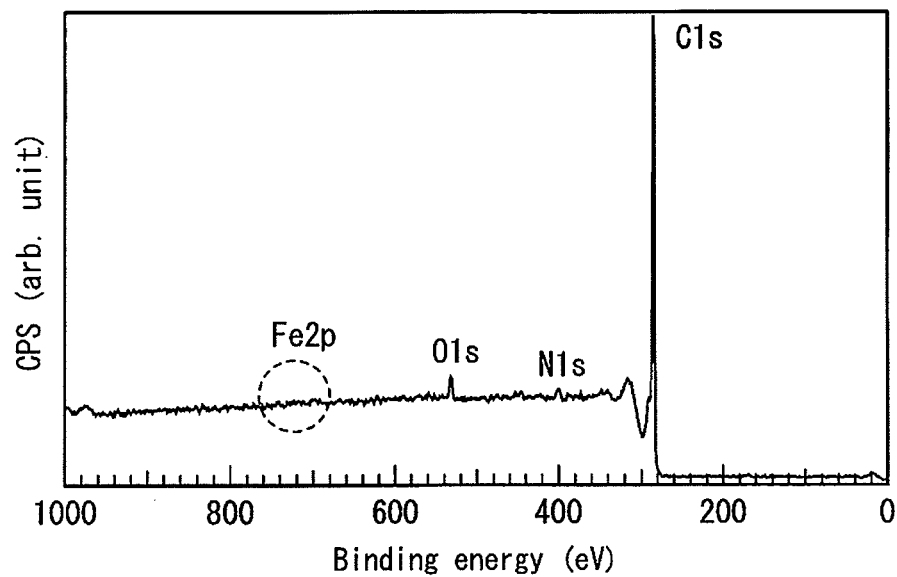
FIG. 4 is a graph showing a spectrum of the carbon-based material of Example 1 obtained by XPS measurement.
Figure 5:
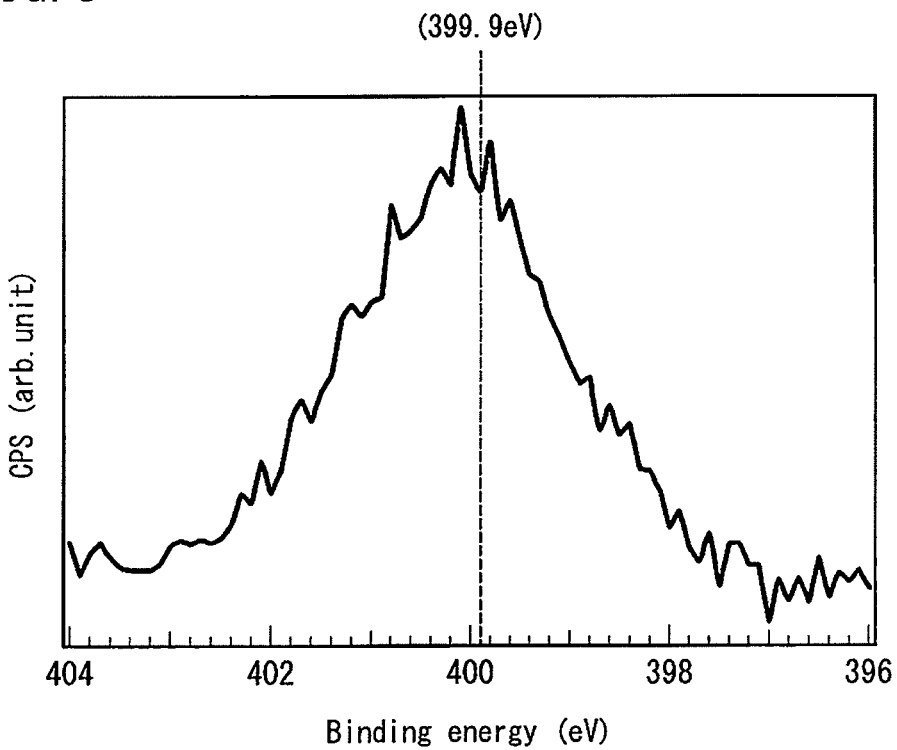
FIG. 5 is an extended graph showing a peak derived from a is orbital of a nitrogen atom in the spectrum of the carbon-based material of Example 1 obtained by XPS measurement.

FIG. 4 shows the result of Example 1. This teaches that the ratio of atoms of the nitrogen to atoms of the carbon is 0.014. Besides, no iron atom was detected. FIG. 5 is an extended graph from FIG. 4 showing a peak derived from a is orbital of a nitrogen atom. FIG. 5 teaches that there is a peak around at 399.9 eV of the binding energy. This shows a presence of nitrogen which is a substitute for carbon in a carbon skeleton composed of sp2-bonded carbon atoms. In other words, this result teaches that the carbon-based material contains atoms of nitrogen as a dopant.

[XAFS Measurement]

XAFS measurement of the carbon-based materials of Examples 1 to 5 was conducted by use of emitted light at a BL11 experiment station of SAGA Light Source. Note that a Si(111) double crystal spectrometer was used as a spectrometer, and a collecting mirror was used as a mirror. The transmission mode was adopted as a detection method, and an ion chamber was used as a detector. For the measurement, the carbon-based material was shaped into a pellet with a hand press, and the measurement was conducted using this pellet-shaped carbon-based material. A radial distribution function was obtained by Fourier transform of a FeK-edge EXAFS in an XAFS spectrum. For this Fourier transform, the ATHENA package was used as a computer program, and the AUTOBK program was used as a computer program for a background operation.

Figure 6:
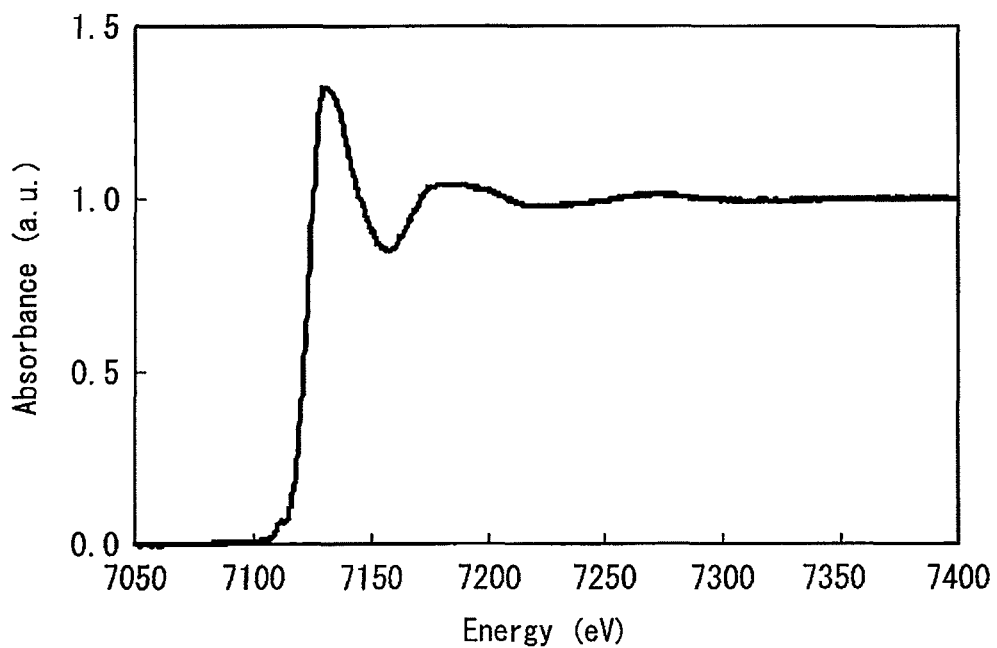
FIG. 6 is a graph showing a FeK-edge XAFS spectrum of the carbon-based material of Example 1.
Figure 7:
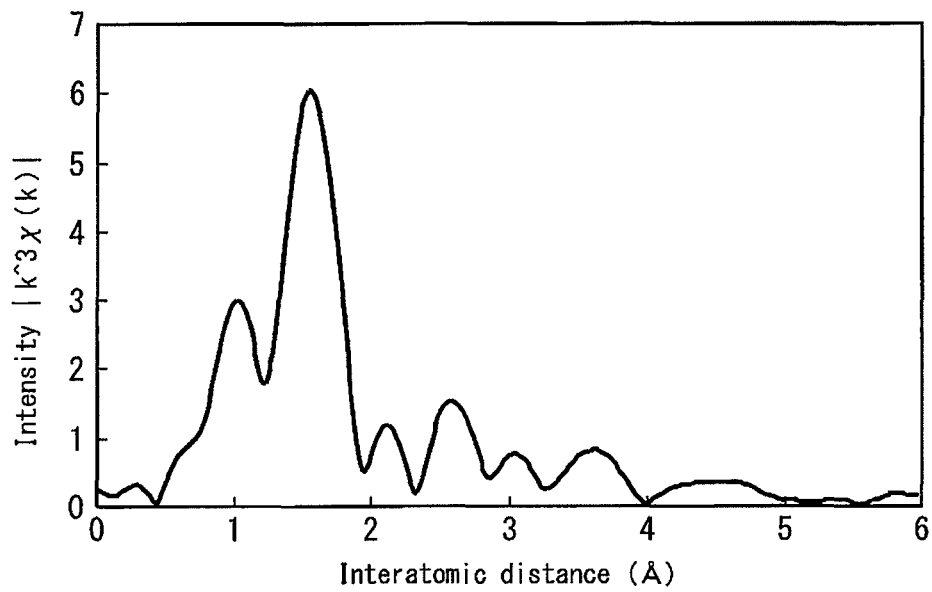
FIG. 7 is a graph showing a radial distribution function derived from a FeK-edge EXAFS in the XAFS spectrum shown in FIG. 6.
Figure 8:
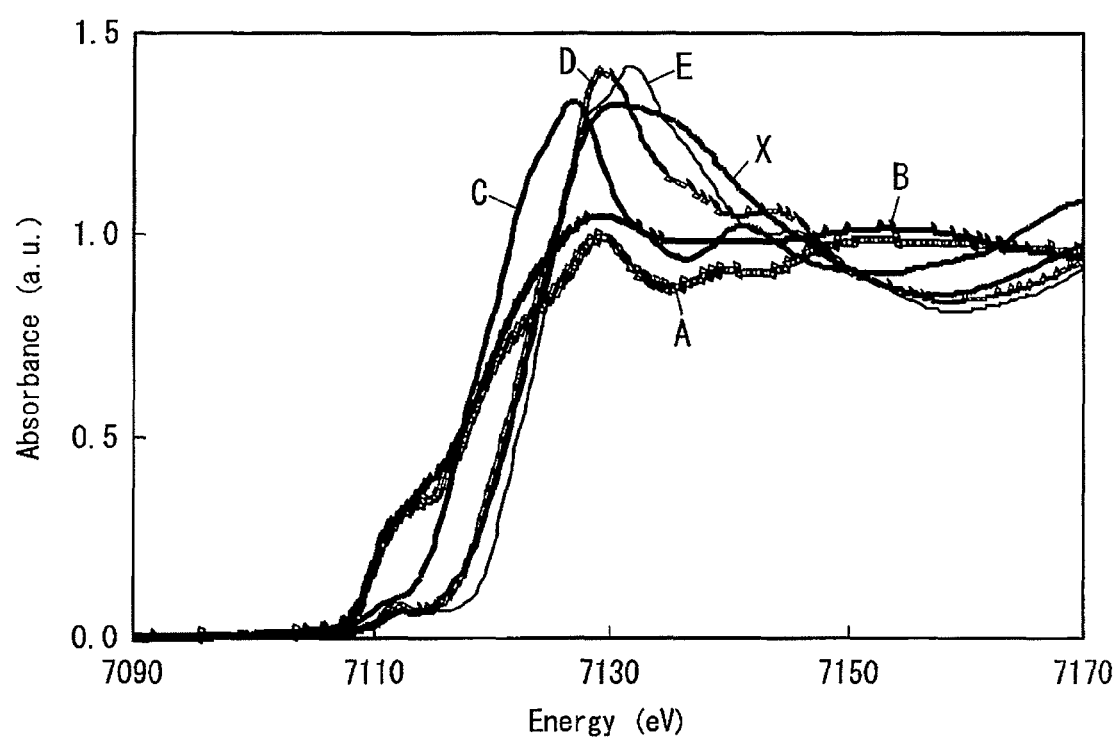
FIG. 8 is a graph showing FeK-edge XANES spectra of the carbon-based material of Example 1, Fe metal, $Fe_3C$, FeO, $Fe_3O_4$, and $\alpha$-$Fe_2O_3$.

FIG. 6 shows an XAFS spectrum regarding Example 1. FIG. 7 shows a radial distribution function obtained by Fourier transform of a FeK-edge EXAFS in this XAFS spectrum. Note that an absorption edge energy ($E_0$) for obtaining the radial distribution function from the FeK-edge EXAFS was 7124.52 eV. FIG. 8 is a graph showing FeK-edge XANES spectra of the carbon-based material of Example 1, Fe metal, $Fe_3C$, FeO, $Fe_3O_4$, and $\alpha\text{-}Fe_2O_3$. In FIG. 8, it is noted that X, A, B, C, D, and E show the results of the carbon-based material of Example 1, Fe metal, $Fe_3C$, FeO, $Fe_3O_4$, and $\alpha\text{-}Fe_2O_3$, respectively.

FIG. 7 teaches that the ratio of "A" to "B" is 5.2, wherein "A" denotes an intensity of the highest one of peaks around a distance equal to a coordinate bond length between atoms of iron and nitrogen and "B" denotes an intensity of the highest one of peaks around a distance equal to a metallic bond length between atoms of iron. In FIG. 7, the highest one having the intensity "B" around a distance equal to the metallic bond length between atoms of iron may be mainly derived from periodic noise caused by Fourier transform. Therefore, there may be practically no metallic bond of atoms of iron. In conclusion, amounts of the inorganic metal compound and the metal crystal contained in the carbon-based material of Example 1 are determined to be markedly small.

In addition, regarding each of Examples 2 to 5, the ratio of "A" to "B" is equal to or more than 4.0.

Besides, FIG. 8 shows that the spectrum of the carbon-based material of Example 1 substantially overlaps with a spectrum of $Fe_3O_4$ in an energy region in which absorbance is in a range of about 0.3 to about 0.5. Regarding XANES spectra, it is generally known that an absorption edge shifts to a higher energy side when a sample has greater valence. Therefore, in Example 1, dopant Fe atoms in the carbon-based material may have a similar valence to that of $Fe_3O_4$, and may have a valence falling in range of a valence of $Fe^{2+}$ to a valence of $Fe^{3+}$.

[X-Ray Diffraction Measurement]

(Measurement of Carbon-Based Materials)

The carbon-based material obtained in Example 1 was washed with acid. The washed carbon-based material was mixed with silicon, and thereafter X-ray diffraction measurement of the resultant carbon-based material was conducted by use of CuKα radiation. Note that silicon was used for correction of a value of an incident angle.

Figure 9:
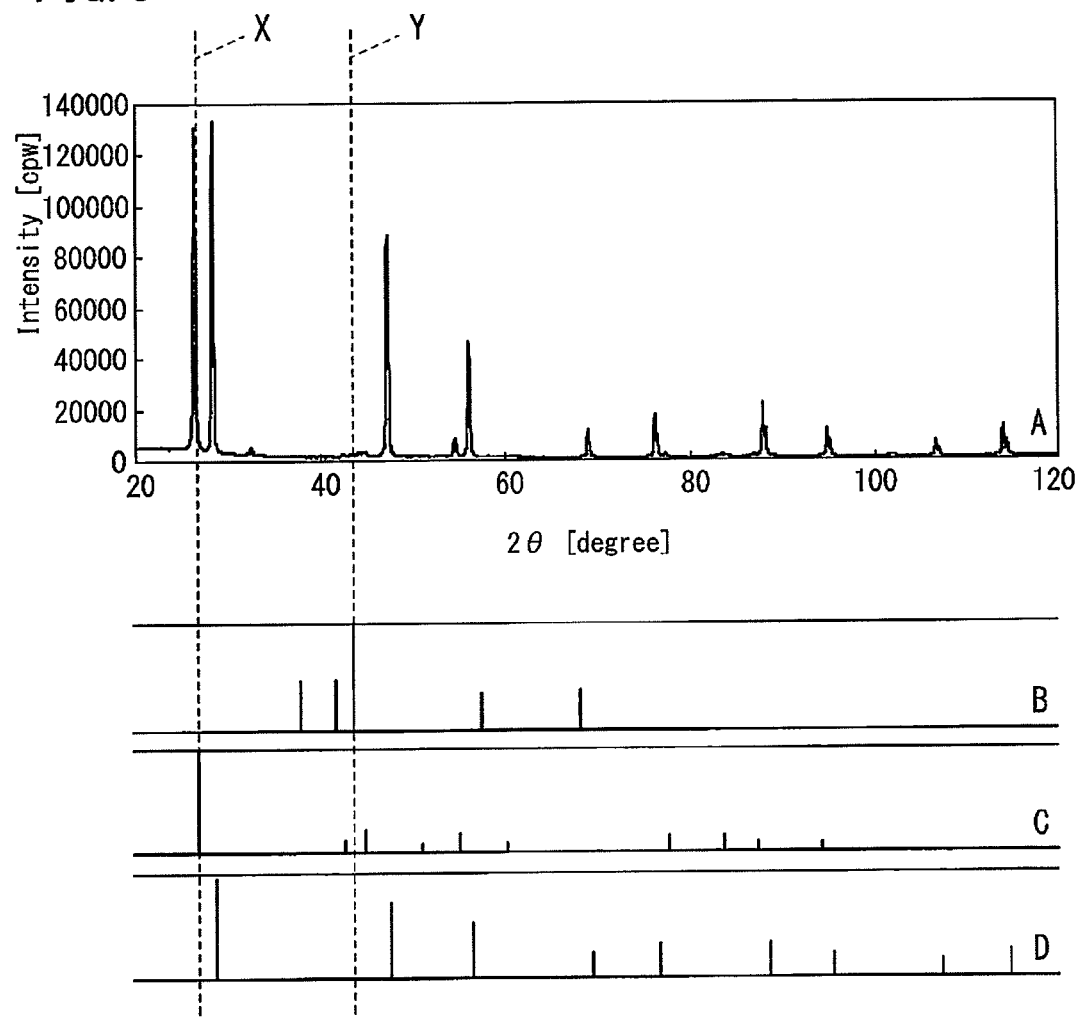
FIG. 9 is a graph showing an X-ray diffraction pattern of the carbon-based material of Example 1.

FIG. 9 shows thus-obtained X-ray diffraction pattern (Reference sign: "A"). FIG. 9 also shows peak positions and the intensities thereof in X-ray diffraction patterns of iron carbide (Reference sign: "B"), graphite (Reference sign: "C"), and silicon (Reference sign: "D") cited from JCPDS cards. Besides, a broken line denoted by a reference "X" shows a position of the (002) peak while a broken line denoted by a reference Y shows a position of the highest peak of iron carbide.

As shown in FIG. 9, the X-ray diffraction pattern regarding Example 1 has peaks of which positions are almost identical to those of the X-ray diffraction pattern of graphite, and has a sharp (002) peak at 2θ of about 26.4°. Besides, the proportion of the intensity of the highest peak derived from iron carbide to the intensity of the sharp (002) peak in the X-ray diffraction pattern regarding Example 1 is 0.012. There is not found a specific peak which is derived from impurities and has such an intensity that a proportion of the intensity to an intensity of the (002) peak exceeds 0.1.

Accordingly, it was confirmed that the carbon-based material having high crystallinity and containing markedly little the inactive compound and the metal crystal was obtained in Example 1.

In addition, regarding each of Examples 2 to 5, the same measurement as Example 1 was conducted. Regarding each of Examples 2 to 5, the proportion of the intensity of the (002) peak to the highest one of intensities of peaks indicating impurities in the X-ray diffraction pattern is equal to or less than 0.1, as with Example 1.

(Comparison in Structure)

Figure 10:
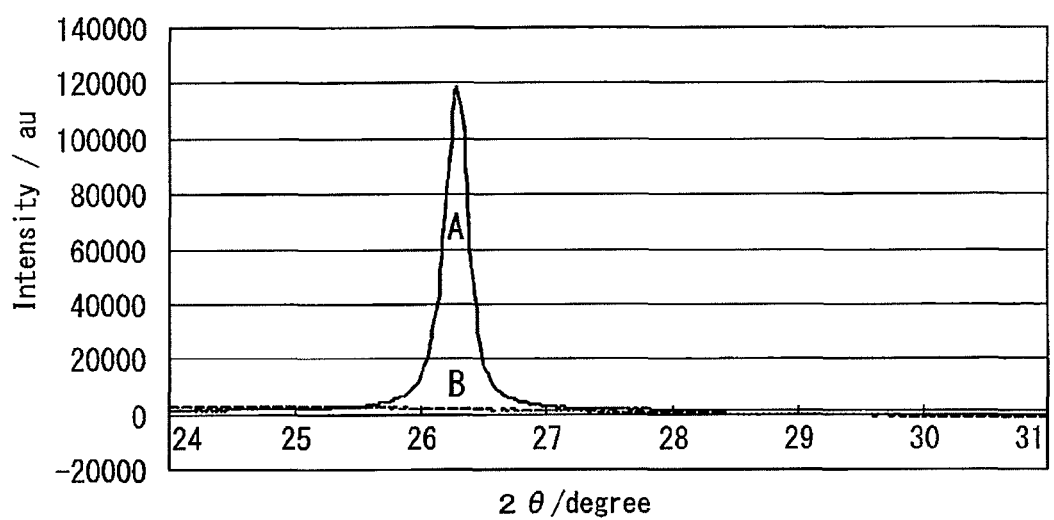
FIG. 10 is a graph showing X-ray diffraction patterns of the carbon-based material of Example 1 and ketjenblack "EC300J"

X-ray diffraction measurement using CuKα radiation was conducted under the same conditions regarding the carbon-based material of Example 1 and ketjenblack "EC300J" (product name) available from Lion Corporation. Prior to the measurement, each material was washed with acid. FIG. 10 shows thus obtained X-ray diffraction patterns. "A" and "B" in FIG. 10 denote the X-ray diffraction patterns of the carbon-based materials obtained in Example 1 and ketjenblack "EC300J", respectively.

These results teach that the (002) peak in the X-ray diffraction pattern of the carbon-based material obtained in Example 1 is markedly higher than the (002) peak in the X-ray diffraction pattern of the ketjenblack "EC300J", and an intensity ratio of the former to the latter is 10.2. In this regard, to calculate the intensity ratio, a base line is created by the Shirley method in a range of 18° to 35° of 2θ, and an intensity of a peak is determined with reference to the base line.

In addition, regarding each of Examples 2 to 5, the same measurement as Example 1 was conducted. Regarding each of Examples 2 to 5, the (002) peak in the X-ray diffraction pattern of the carbon-based material obtained in Example 1 is markedly higher than the (002) peak in the X-ray diffraction pattern of the ketjenblack "EC300J", as with Example 1.

[Cyclic Voltammetry]

First, 5 mg of the carbon-based material of Example 1, 175 mL of ethanol, and 47.5 mL of 5% Nafion dispersion were mixed to prepare a mixture, and the mixture was subjected to ultrasonic dispersion.

Then, 7 mL of the resultant mixture was dropped onto a GC (glassycarbon) rotating disk electrode having an area of 0.196 cm$^2$ and then was dried. Accordingly, the carbon-based material was attached to the rotating disk electrode at the attached amount of about 800 mg/cm$^2$. The rotating disk electrode voltammetry was conducted using this rotating disk electrode and an electrolyte of an aqueous solution of 0.5 M H$_2$SO$_4$ under conditions of a rotation speed of 1500 rpm, a sweep speed of 10 mV/s, and a sweep range of 0.07 to 0.97 V (vs. RHE), while this electrolyte was bubbled with nitrogen gas.

Figure 11:
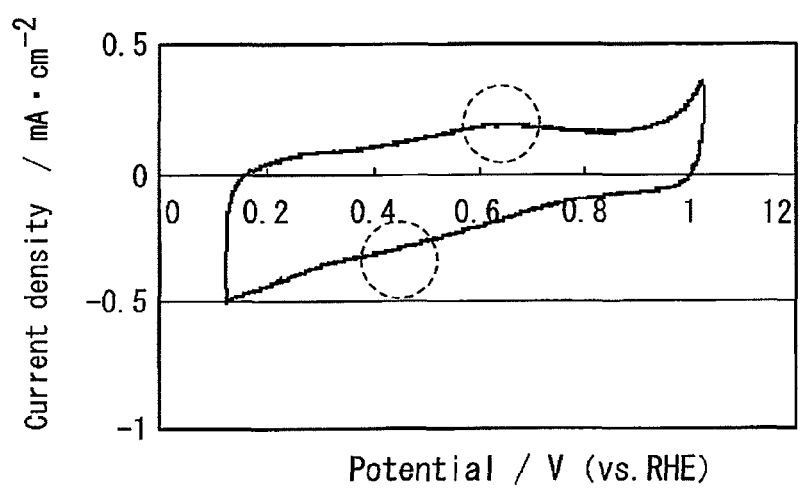
FIG. 11 is a cyclic voltammogram of the carbon-based material of Example 1 obtained by cyclic voltammetry.

FIG. 11 shows thus-obtained cyclic voltammogram. This teaches that the cyclic voltammogram has peaks derived from a redox reaction of dopant atoms (ions) of iron in the carbon-based material. In FIG. 11, the positions of these peaks were indicated by circles of broken lines.

[Evaluation of Oxygen Reduction Activity]

Oxygen reduction activity of each of the carbon-based materials of Example 1 and Comparative Example 1 and the CoDAPP catalyst of Comparative Example 2 was evaluated by the following manner when they were used as a catalyst.

First, 5 mg of the carbon-based material or the CoDAPP catalyst, and 175 mL of ethanol, and 47.5 mL of 5% Nafion dispersion were mixed to prepare mixtures, and the mixtures were subjected to ultrasonic dispersion.

Then, 7 mL of the resultant mixtures were individually dropped onto GC (glassycarbon) rotating disk electrodes each having an area of 0.196 cm$^2$ and then were dried. Accordingly, the carbon-based material and the CoDAPP catalyst were attached to the rotating disk electrodes at the attached amount of about 800 mg/cm$^2$. The rotating disk electrode voltammetry was conducted using these rotating disk electrodes, individually and an electrolyte of an aqueous solution of 0.5 M H$_2$SO$_4$ or an electrolyte of an aqueous solution of 0.1 M NaOH under conditions of a rotation speed of 1500 rpm and a sweep speed of 10 mV/s.

Figure 12:
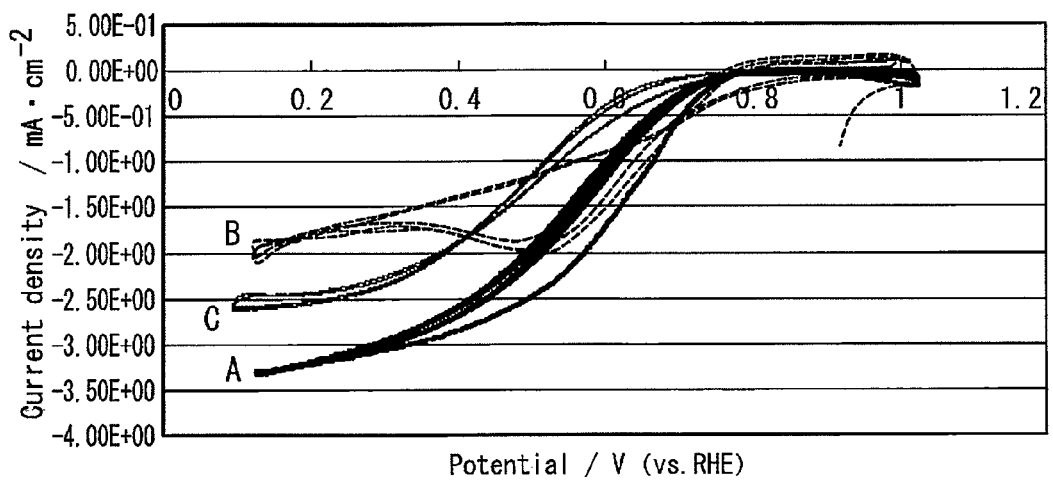
FIG. 12 is a graph showing voltammograms of carbon-based materials of Examples 1 and 2 and Comparative Examples 1 and 2 obtained by rotating disk electrode voltammetry in an oxygen reduction region in 0.5 M $H_2SO_4$.
Figure 13:
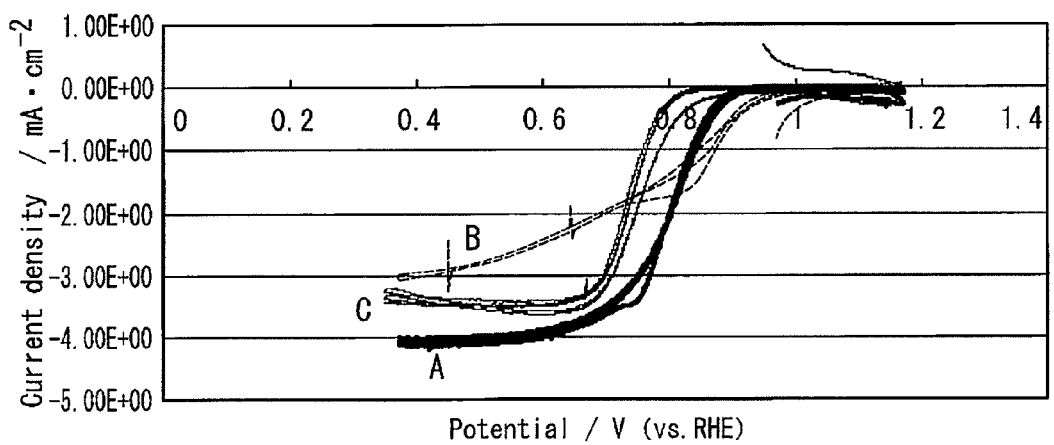
FIG. 13 is a graph showing voltammograms of the carbon-based materials of Examples 1 and 2 and Comparative Examples 1 and 2 obtained by rotating disk electrode voltammetry in the oxygen reduction region in 0.1 M NaOH.

FIG. 12 shows voltammograms obtained by use of the aqueous solution of 0.5 M H$_2$SO$_4$ as the electrolyte. FIG. 13 shows voltammograms obtained by use of the aqueous solution of 0.1 M NaOH as the electrolyte. Note that "A" denotes the results of Example 1, "B" denotes the results of Comparative Example 1, and "C" denotes the results of Comparative Example 2. As shown in these results, regarding Example 1, an oxygen reduction reaction proceeds in the aqueous solution of H$_2$SO$_4$ when an electrode potential exceeds about 0.7 V (vs.RHE), and an oxygen reduction reaction proceeds in the aqueous solution of NaOH when an electrode potential exceeds about 0.9 V (vs.RHE). Onset potentials of the carbon-based material of Example 1 are comparable or superior to those of Comparative Examples 1 and 2, and a current in each of Examples 1 and 2 at the onset potential of +0.6V is greater than those of Comparative Examples 1 and 2. These catalytic activities reach the highest level in view of non-platinum based oxygen reduction catalysts.

Note that the reason why the catalytic performance of the carbon-based material of Example 1 is superior to that of the CoDAPP catalyst of Comparative Example 2 may be because in Comparative Example 2, an amount of the inactive metal compound or the metal crystal is increased, or a particle size thereof is increased due to the long sintering time in preparation of the CoDAPP. Hence, the catalytic activity thereof may be inhibited.

[Evaluation of Heating Time in Preparation]

Six types of the carbon-based material were obtained in the same manner as that of Example 1 except for varying heating time of a sample in preparation of the carbon-based material.

Figure 14:
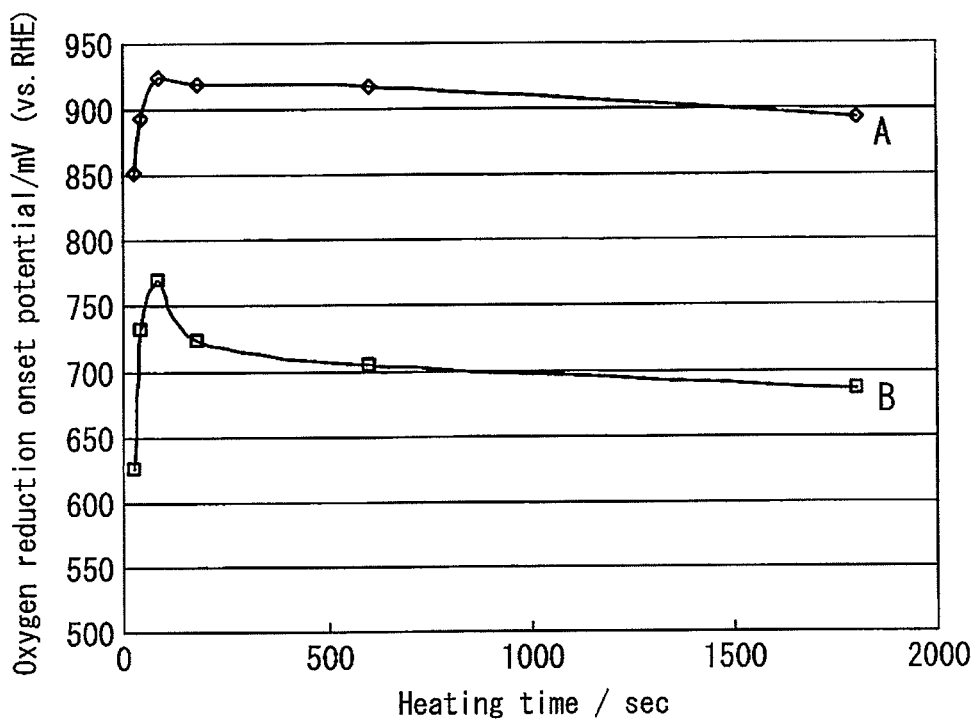
FIG. 14 is a graph showing onset potentials of six types of the carbon-based material of Example 1 different in heating time in a manufacturing process.

Regarding these six types of the carbon-based material, an onset potential of an oxygen reduction current was measured in each of cases of using the aqueous solution of 0.5 M H$_2$SO$_4$ as the electrolyte and using the aqueous solution of 0.1 M NaOH as the electrolyte. FIG. 14 shows the results. Note that, in FIG. 14, the horizontal axis shows the heating time of the sample and the vertical axis shows the onset potential. Besides, "A" denotes the result of the case using the aqueous solution of 0.1 M NaOH, and "B" denotes the result of the case using the aqueous solution of 0.5 M $H_2SO_4$.

These results teach that in the heating time of 45 sec or more but less than 600 sec, the onset potential is high, namely, the catalytic activity is high. Besides, these results teach that in the heating time of 45 sec to 180 sec, the catalytic activity is markedly high.

[Evaluation of Heating Temperature in Preparation]

Three types of the carbon-based material were obtained in the same manner as that of Example 1 except for varying heating temperature for a sample in preparation of the carbon-based material.

Figure 15:
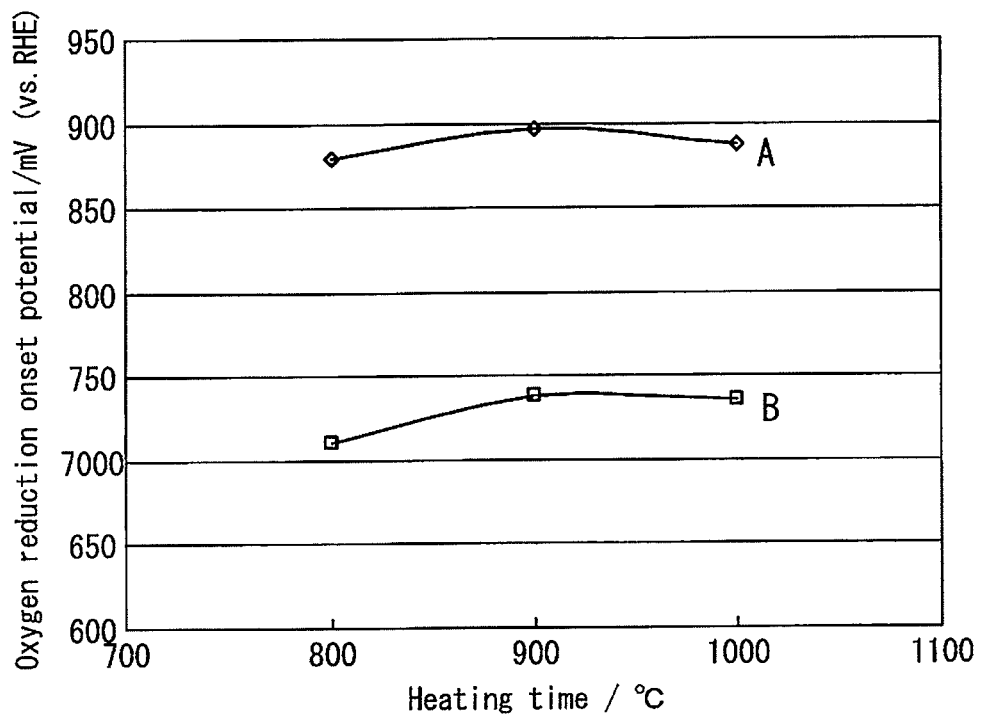
FIG. 15 is a graph showing onset potentials of three types of the carbon-based material of Example 1 different in a heating time in the manufacturing process.

Regarding each of these three types of the carbon-based material, an onset potential of an oxygen reduction current was measured in each of cases of using the aqueous solution of 0.5 M $H_2SO_4$ as the electrolyte and using the aqueous solution of 0.1 M NaOH as the electrolyte. FIG. 15 shows the results. Note that, in FIG. 15, the horizontal axis shows a heating temperature for the sample and the vertical axis shows the onset potential. Besides, "A" denotes the case of using the aqueous solution of 0.1 M NaOH, and "B" denotes the case of using the aqueous solution of 0.5 M $H_2SO_4$.

These results teach that in the heating temperature of 800° C. to 1000° C., the onset potential is high, namely, the catalytic activity is high.

[Evaluation of Oxygen Evolution Activity]

Oxygen evolution activity of each of the carbon-based materials of Examples 2, 4, and 5, untreated graphite particles, and an untreated graphite sheet when used as a catalyst was evaluated by the following manner.

First, electric wiring was provided on each of the carbon-based materials, the graphite particles, and the graphite sheet, and used as a working electrode. Voltammetry was conducted using this working electrode and an electrolyte of an aqueous buffer solution of 0.05 M phosphoric acid under conditions of a sweep speed of 10 mV/s.

Figure 16:
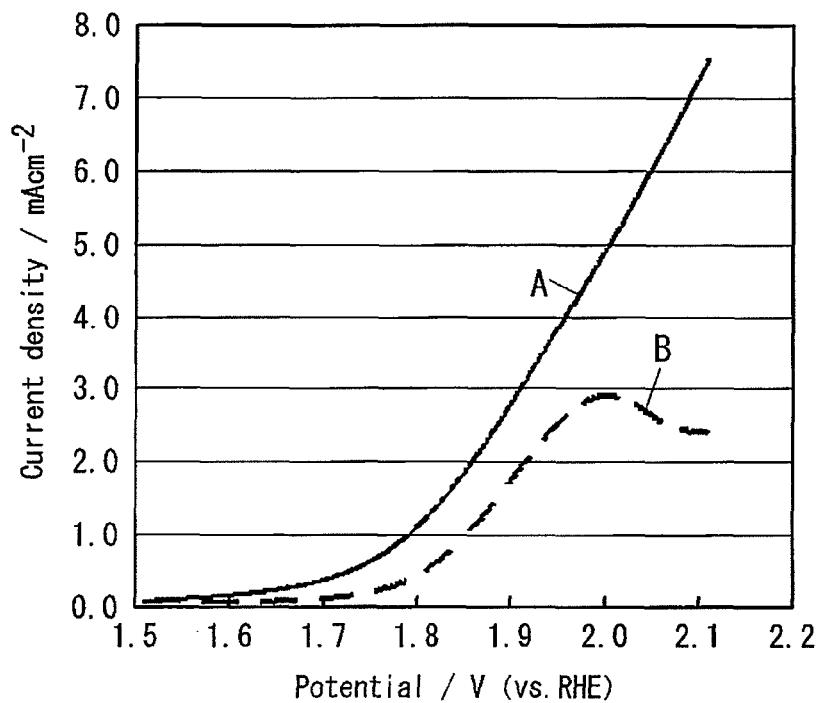
FIG. 16 is a graph showing voltammograms of graphite particles of Example 2 and untreated graphite particles in an oxide evolution region in a phosphoric acid solution.
Figure 17:
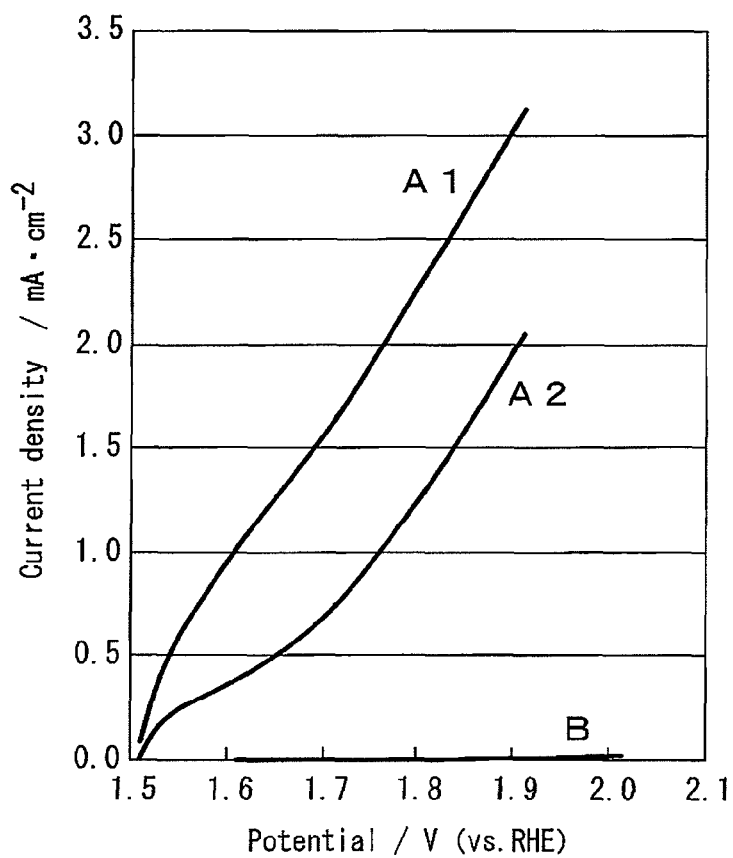
FIG. 17 is a graph showing voltammograms of graphite sheets of Examples 4 and 5 and an untreated graphite sheet in the oxide evolution region in a phosphoric acid solution.

FIGS. 16 and 17 show thus-obtained voltammograms. Note that "A" in FIG. 16 denotes the results of Example 2, and "B" denotes the results of the untreated graphite particles. Besides, "A1" in FIG. 17 denotes the results of Example 4, "A2" denotes the results of Example 5, and "B" denotes the result of the untreated graphite sheet. As shown in these results, the untreated graphite particles and the untreated graphite sheet have low oxygen evolution reaction activities. In contrast, regarding Examples 2, 4, and 5, an oxygen reduction reaction proceeds when an electrode potential exceeds about 1.5 V (vs.RHE). These catalytic activities of the carbon-based materials of Examples 2, 4, and 5 reach the highest level in view of carbon-based oxygen evolution catalysts.

Example 6

Into a container, 3 g of amorphous carbon particles (available from Cabot corporation, the product name: VULCAN XC-72, the average primary particle diameter: 30 nm), an aqueous solution of 0.1 M iron chloride (III) and an ethanol solution of 0.15 M pentaethylene hexamine were added to prepare a mixture. An amount of the aqueous solution of 0.1 M iron chloride (III) used was selected so that a percentage of atoms of iron to the amorphous carbon particles was 10 mass %. Ethanol was further added to the mixture so that the resultant mixture has a total volume of 9 mL. The resultant mixture was subjected to ultrasonic dispersion, followed by drying with a dryer at 60° C. Consequently, a sample containing amorphous carbon particles, iron chloride (III), and pentaethylene hexamine was obtained.

The sample was placed in an end of a quartz tube, and an atmosphere in the quartz tube was replaced by argon. This quartz tube was inserted in an oven at 900° C., placed for 45 sec, and then withdrawn. The heating rate at the start of heating the sample was adjusted to 300° C./s by adjusting a time of insertion of the quartz tube into the oven to three seconds. Thereafter, the sample was cooled by allowing argon gas to pass through the quartz tube. Consequently, a carbon-based material was obtained.

For acid wash, this carbon-based material was dispersed in pure water for 30 min with a homogenizer, and thereafter the resultant carbon-based material was added into 2 M sulfuric acid and stirred at 80° C. for 3 hours.

Example 7

The carbon-based material of Example 7 was prepared in the same manner and under the same conditions as those of Example 6 except for using an aqueous solution of 0.1 M cobalt chloride instead of iron chloride (III) as a metal source.

In a reactor, 3 g of graphite (Wako 40 mm), 138 mL of concentrated sulfuric acid, and 3.47 g of potassium nitrate were mixed to prepare a mixture liquid. 12 g of Potassium permanganate was further added slowly thereto, with the reactor being in an ice bath. Subsequently, thus-obtained mixture liquid was stirred at 40° C. for 30 min, and then 240 mL of ion-exchanged water was added thereto, followed by stirring and heating at 90° C. for 1 hour. Thereafter, into the reactor, 600 mL of ion-exchanged water and 18 mL of 30% hydrogen peroxide solution were added to finish the reaction. Then, the resultant mixture liquid was washed with hydrochloric acid and water, followed by removing ions therefrom by dialysis. Furthermore, ultrasonic was applied to the resulting mixture liquid to make graphene oxide separated. Thus-obtained graphene oxide was dried. Then, into 200 mg of the dried graphene oxide, an aqueous solution of 0.1 M iron chloride (III) and an ethanol solution of 0.15 M pentaethylene hexamine were added to prepare a mixture. An amount of the aqueous solution of 0.1 M iron chloride (III) was selected so that a percentage of Fe atoms to graphene was 10 mass %. Ethanol was further added to the mixture so that the resultant mixture has a total volume of 9 mL. The resultant mixture was subjected to ultrasonic dispersion, followed by drying with a dryer at 60° C.

Thus-obtained sample was placed in an end of a quartz tube, and an atmosphere in the quartz tube was replaced by argon. This quartz tube was inserted in an oven at 900° C., placed for 45 sec, and then withdrawn. The heating rate at the start of heating the sample was adjusted to 300° C./s by adjusting a time of insertion of the quartz tube into the oven to three seconds. Thereafter, the sample was cooled by allowing argon gas to pass through the quartz tube. Consequently, a carbon-based material was obtained.

Comparative Example 4

2,6-Diaminopyridine monomer (available from Aldrich) and ammonium peroxodisulfate (APS) (available from Wako Pure Chemical Industries, Ltd) used as oxidant were mixed and stirred at a molar ratio of the former to the latter being 1:1.5. Specifically, 5.45 g of 2,6-diaminopyridine and 1 g of sodium hydroxide were dissolved in 400 mL of distilled water, and thereafter 27.6 g of APS and 100 mL of water were further added. Thus-obtained mixture was stirred for 5 min, and left for 12 hours at room temperature to make a polymerization reaction of 2,6-diaminopyridine proceed. Subsequently, the resultant mixture was centrifuged at 3000 rpm to collect black precipitate. This precipitate was washed with distilled water three times, and thereafter the washed precipitate was dried for several hours at 60° C. under vacuum. Consequently, 2,6-diaminopyridine polymer was obtained.

5.45 g of 2,6-Diaminopyridine polymer and 3.62 g of cobalt nitrate $Co(NO_3)$ (available from Wako Pure Chemical Industries, Ltd) were suspended in 150 mL a water: ethanol (1:1) solution so that a molar ratio of 2,6-diaminopyridine polymer (starting monomer) to cobalt (catalyst metal atom) was 4:1. Similarly, to obtain molar ratios of 2,6-diaminopyridine polymer to cobalt were 6:1, 8:1, and 10:1, amounts of 2,6-diaminopyridine polymer and cobalt were calculated and compounded. Thus-obtained suspensions were ultrasonically mixed for 1 hour with sonicator ultrasonic probe systems (available from AS ONE Corporation), and further stirred for 2 hours at 60° C. to vaporize the solution. Thus-obtained powder of a polymer metal complex of 2,6-diaminopyridine polymer and cobalt was grounded with a quartz crystal mortar.

The polymer metal complex was sintered at 700° C. for 1.5 hour under ammonia gas atmosphere. The resultant sintered metal complex was subjected to ultrasonic acid-wash treatment (pre-leach) for 8 hours with 12 Normal solution of hydrochloric acid, and an insoluble substance and an inactive substance were removed therefrom, and subsequently the resultant complex was washed wish deionized water sufficiently. Finally, the resultant sintered metal complex which was an electrode catalyst in accordance with the present invention was collected by filtration and the collected metal complex was dried at 60° C. Consequently, Co-2,6-diaminopyridine polymer (CoDAPP) catalyst was obtained.

[Evaluation of an Amount of Impurity]

Figure 18:
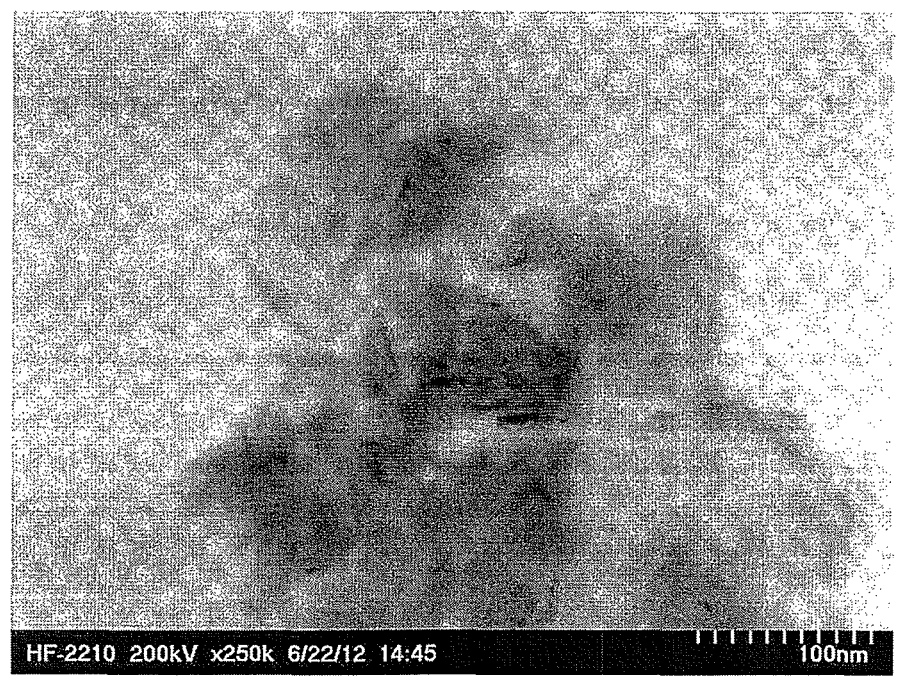
FIG. 18 is a transmission electron micrograph of a carbon-based material of Example 6.

The carbon-based materials of Examples 6 and 7 were observed with a transmission electron microscope. For the observation with the transmission electron microscope, the carbon-based material was dispersed on a microgrid made of Cu, and the observation was conducted under conditions that an accelerating voltage was 300 kV. As a result, regarding all of the carbon-based materials, presence of a particle containing at least one of the inactive metal compound and the metal crystal is not confirmed. FIG. 18 shows an image of the carbon-based material of Example 6 taken with a transmission electron microscope.

[XPS Measurement]

XPS measurement of the carbon-based materials of Examples 6 and 7 was conducted by use of a characteristic X-ray of Al as a radiation source under vacuum of $3\times10^{-8}$ Pa. For the measurement, the carbon-based material was fixed with a press to an In foil. As a result, regarding all of the Examples, the ratio of atoms of the metal to atoms of the carbon was less than 0.01, and the ratio of atoms of the non-metal to atoms of the carbon was less than 0.05.

Figure 19:
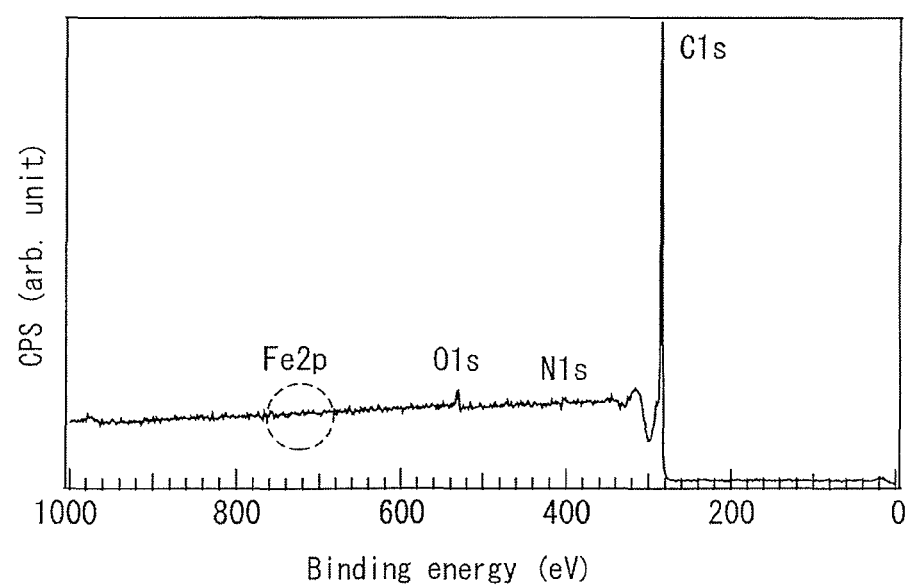
FIG. 19 is a graph showing a spectrum of the carbon-based material of Example 6 obtained by XPS measurement.

FIG. 19 shows the result regarding Example 6. This teaches that the ratio of atoms of the nitrogen to atoms of the carbon is 0.015. Besides, no iron atom was detected.

[XAFS Measurement]

XAFS measurement of the carbon-based materials of Examples 6 and 7 was conducted by use of a beam of light at a BL11 experiment station of SAGA Light Source. Note that a Si(111) double crystal spectrometer was used as a spectrometer, and a collecting mirror was used as a mirror. The transmission mode was adopted as a detection method, and an ion chamber was used as a detector. For the measurement, the carbon-based material was shaped into a pellet with a hand press, and the measurement was conducted using this pellet-shaped carbon-based material. A radial distribution function was obtained by Fourier transform of a FeK-edge EXAFS in an XAFS spectrum. For this Fourier transform, the ATHENA package was used as a computer program, and for a background operation, the AUTOBK program was used as a computer program.

Figure 20:
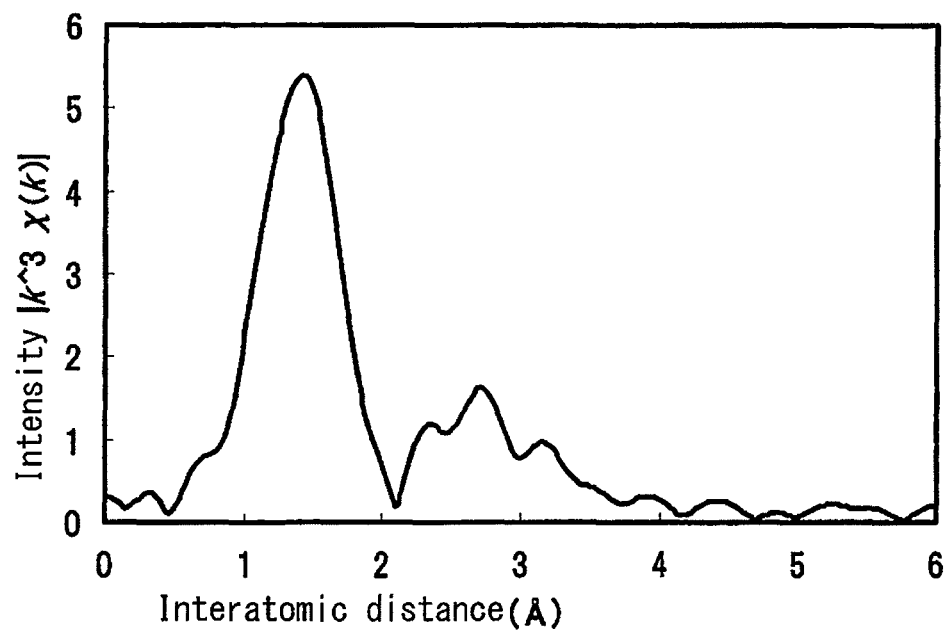
FIG. 20 is a graph showing a FeK-edge XAFS spectrum of the carbon-based material of Example 6.
Figure 21:
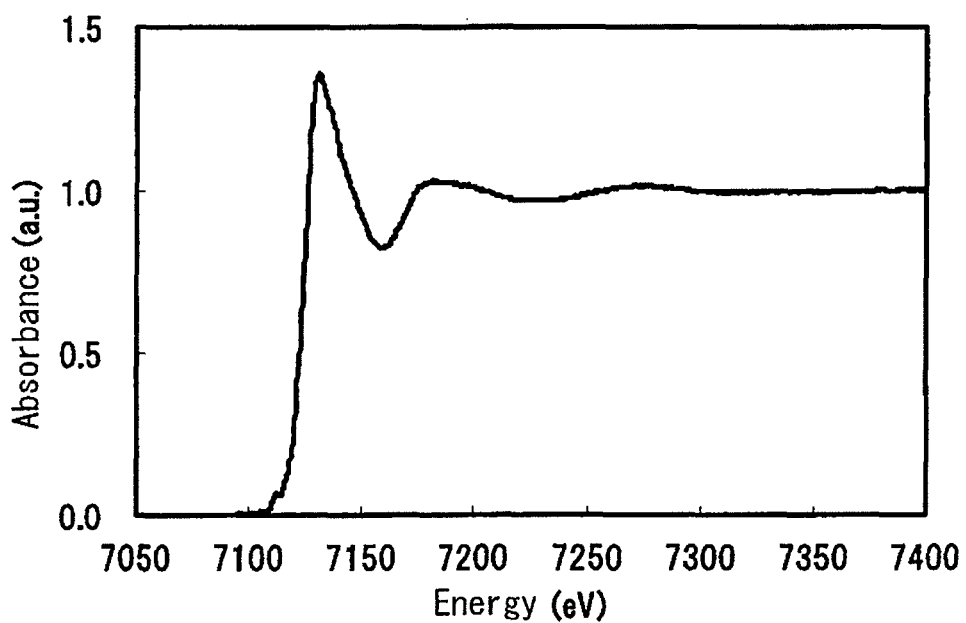
FIG. 21 is a graph showing a radial distribution function derived from a FeK-edge EXAFS in the XAFS spectrum shown in FIG. 20.
Figure 22:
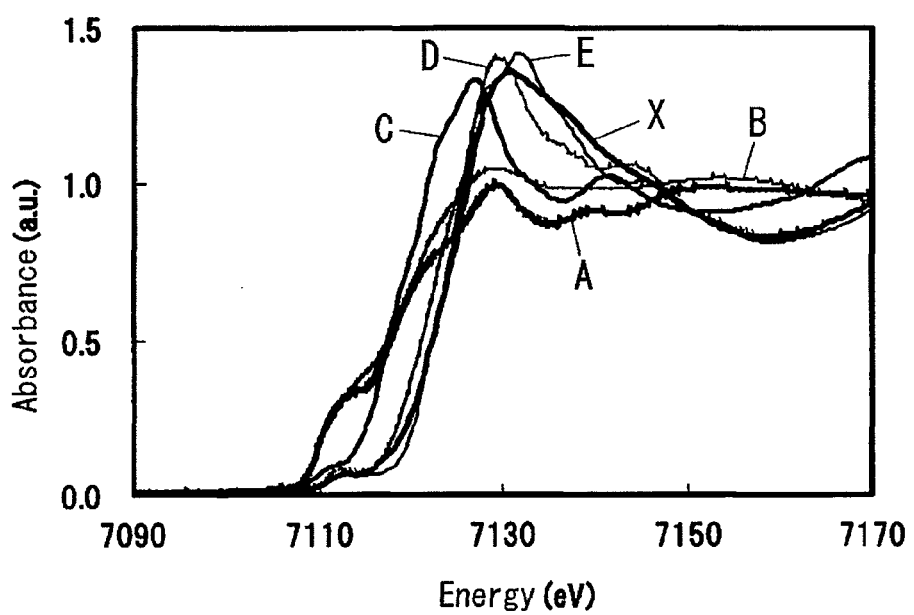
FIG. 22 is a graph showing FeK-edge XANES spectra of the carbon-based material of Example 6, Fe metal, $Fe_3C$, FeO, $Fe_3O_4$, and $\alpha$-$Fe_2O_3$.

FIG. 20 shows an XAFS spectrum regarding Example 6. FIG. 21 shows a radial distribution function obtained by Fourier transform of a FeK-edge EXAFS in this XAFS spectrum. Note that an absorption edge energy ($E_0$) for obtaining the radial distribution function from the FeK-edge EXAFS was 7124.52 eV. FIG. 22 is a graph showing XANES spectra of the carbon-based material of Example 6, Fe metal, $Fe_3C$, FeO, $Fe_3O_4$, and $\alpha$-$Fe_2O_3$. In FIG. 22, it is noted that X, A, B, C, D, and E show the results of the carbon-based material of Example 6, Fe metal, $Fe_3C$, FeO, $Fe_3O_4$, and $\alpha$-$Fe_2O_3$, respectively.

FIG. 21 teaches that the ratio of "A" to "B" is 4.6, wherein "A" denotes an intensity of the highest one of peaks around a distance equal to a coordinate bond length between atoms of iron and nitrogen and "B" denotes an intensity of the highest one of peaks around a distance equal to a metallic bond length between atoms of iron. In FIG. 21, the highest one having the intensity "B" around a distance equal to the metallic bond length between atoms of iron shifts from a median (2.1 Å) of the metallic bond length of iron by about 0.3 Å, and may be mainly derived from periodic noise caused by Fourier transform. Therefore, there may be practically no metallic bond of atoms of iron. In conclusion, amounts of the inorganic metal compound and the metal crystal contained in the carbon-based material of Example 6 are determined to be markedly small.

In addition, also regarding Example 7, the ratio of "A" to "B" is equal to or more than 4.0.

Besides, FIG. 22 shows that the spectrum of the carbon-based material of Example 6 substantially overlaps with a spectrum of $\alpha$-$Fe_2O_3$ in an energy region in which absorbance is in a range of about 0.3 to about 0.5. Regarding XANES spectra, it is generally known that an absorption edge shifts to a high energy side when a sample has greater valence. Therefore, in Example 6, dopant Fe atoms in the carbon-based material may be mainly $Fe^{3+}$.

[X-Ray Diffraction Measurement]
(Measurement of Carbon-Based Materials)

Figure 23:
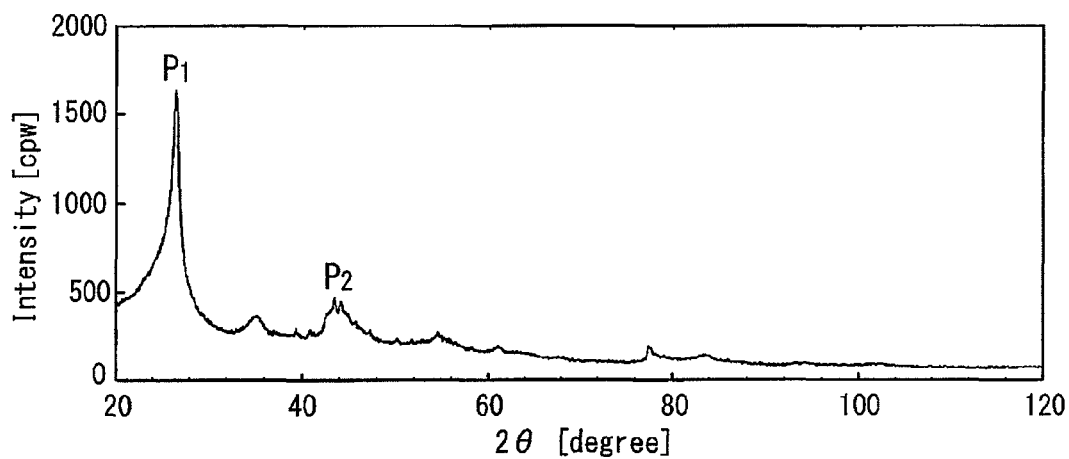
FIG. 23 is a graph showing an X-ray diffraction pattern of the carbon-based material of Example 6.

First, the carbon-based material obtained in Example 6 was washed with acid, and X-ray diffraction measurement of the resultant carbon-based material was conducted by use of CuKα radiation. FIG. 23 shows thus-obtained X-ray diffraction pattern. As shown in FIG. 23, the X-ray diffraction pattern regarding Example 6 has a sharp (002) peak (Reference: $P_1$) at 2θ of about 26.4°. Besides, this X-ray diffraction pattern has a peak (Reference: $P_2$) derived from iron carbide in the carbon-based material, and a proportion of the intensity of the peak derived from iron carbide to the intensity of the (002) peak is 0.059. There is not found a further peak derived from an impurity.

Accordingly, it was confirmed that the carbon-based material containing markedly little the inactive compound and the metal crystal was obtained in Example 6.

In addition, regarding Example 7, the same measurement as Example 1 was conducted. Regarding Example 7, the proportion of the highest one of intensities of peaks indicating impurities to the intensity of the (002) peak in the X-ray diffraction pattern is equal to or less than 0.1, as with Example 6.

(Comparison in Structure)

Figure 24:
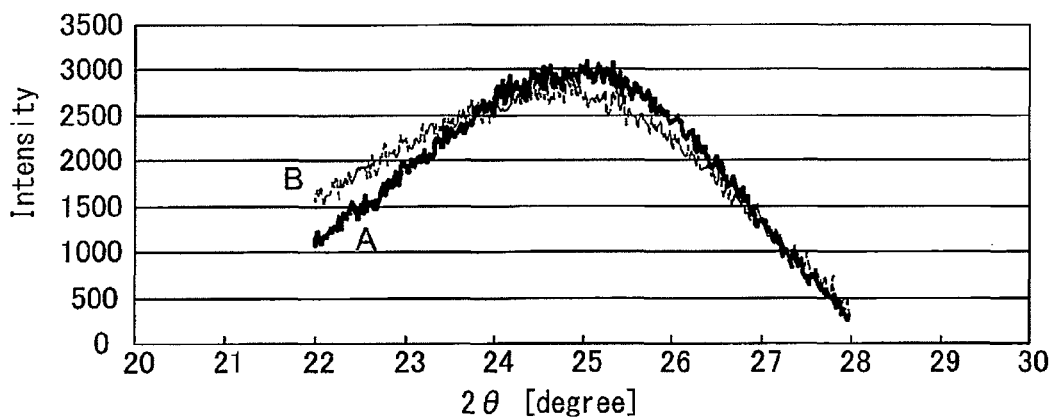
FIG. 24 is a graph showing X-ray diffraction patterns of the carbon-based material of Example 6 and ketjenblack "EC300J"

X-ray diffraction measurement using CuKα radiation was conducted under the same conditions regarding the carbon-based material of Example 6 and ketjenblack "EC300J" (product name) available from Lion Corporation. Prior to the measurement, each material was washed with acid. FIG. 24 shows thus obtained X-ray diffraction patterns. "A" and "B" in FIG. 24 denote the X-ray diffraction patterns of the carbon-based materials obtained in Example 6 and ketjenblack "EC300J", respectively.

These results teach that an intensity ratio of the (002) peak in the X-ray diffraction pattern of the carbon-based material obtained in Example 6 to the (002) peak in the X-ray diffraction pattern of the ketjenblack "EC300J" is 1.1. In this regard, to calculate the intensity ratio, a base line is created by the Shirley method in a range of 18° to 35° of 2θ, and an intensity of a peak is determined with reference to the base line.

[Cyclic Voltammetry]

First, 5 mg of the carbon-based material of Example 6, 175 mL of ethanol, and 47.5 mL of 5% Nafion dispersion were mixed to prepare a mixture, and the mixture was subjected to ultrasonic dispersion.

Figure 25:
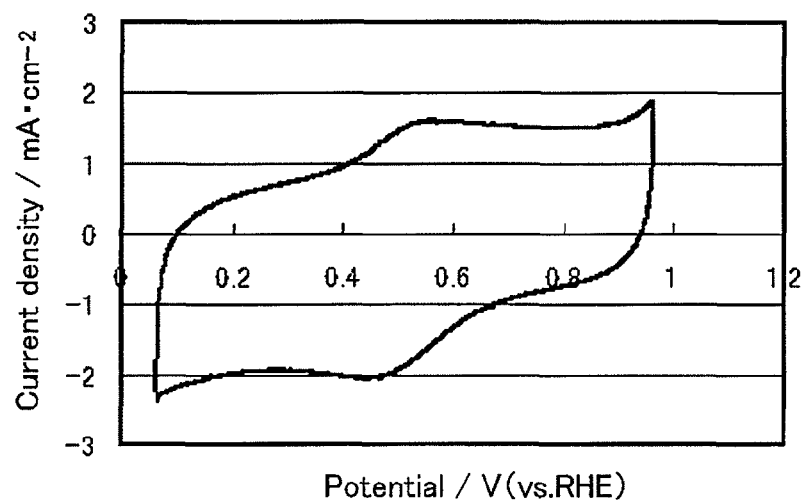
FIG. 25 is a cyclic voltammogram of the carbon-based material of Example 6 obtained by cyclic voltammetry.

Then, 7 mL of the resultant mixture was dropped onto a GC (glassycarbon) rotating disk electrode having an area of 0.196 cm$^2$ and then was dried. Accordingly, the carbon-based material was attached to the rotating disk electrode at the attached amount of about 800 mg/cm$^2$. The cyclic voltammetry was conducted using this rotating disk electrode and an electrolyte of an aqueous solution of 0.5 M $H_2SO_4$ under conditions of a rotation speed of 1500 rpm, a sweep speed of 10 mV/s, and a sweep range of 0.07 to 0.97V (vs. RHE), while this electrolyte was bubbled with nitrogen gas. FIG. 25 shows thus-obtained cyclic voltammogram. This teaches that the cyclic voltammogram has peaks derived from a redox reaction of dopant atoms (ions) of iron in the carbon-based material.

[Evaluation of Oxygen Reduction Activity]

Oxygen reduction activity of each of the carbon-based materials of Examples 6, 7 and Comparative Example 3, and the CoDAPP catalyst of Comparative Example 4 was evaluated by the following manner when they were used as a catalyst.

First, 5 mg of the carbon-based material or the CoDAPP catalyst, and 175 mL of ethanol, and 47.5 mL of 5% Nafion dispersion were mixed to prepare mixtures, and the mixtures were subjected to ultrasonic dispersion.

Then, 7 mL of the resultant mixtures were individually dropped onto GC (glassycarbon) rotating disk electrodes each having an area of 0.196 cm$^2$ and then were dried. Accordingly, the carbon-based material and the CoDAPP catalyst were attached to the rotating disk electrodes at the attached amount of about 800 mg/cm$^2$. The rotating disk electrode voltammetry was conducted using these rotating disk electrodes, individually and an electrolyte of an aqueous solution of 0.5 M $H_2SO_4$ or an electrolyte of an aqueous solution of 0.1 M NaOH under conditions of a rotation speed of 1500 rpm, a sweep speed of 10 mV/s.

Figure 26:
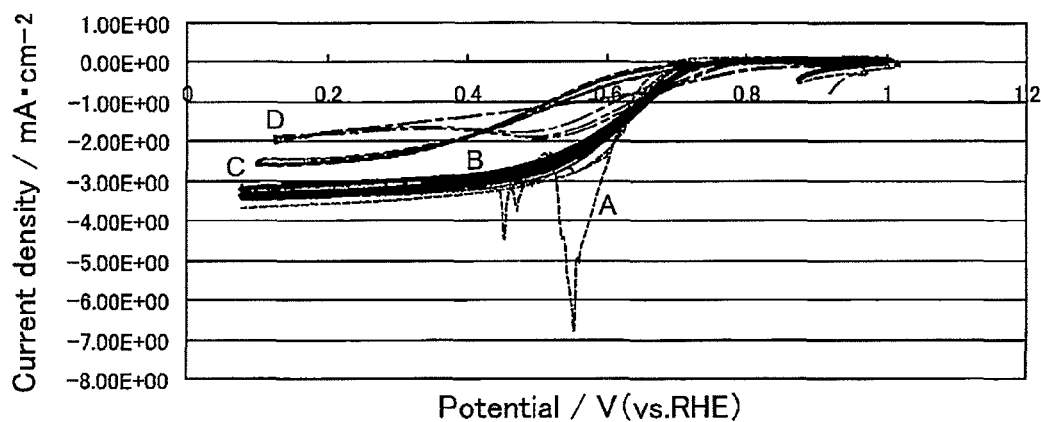
FIG. 26 is a graph showing voltammograms of carbon-based materials of Examples 6 and 7 and Comparative Examples 3 and 4 obtained by rotating disk electrode voltammetry in the oxygen reduction region in 0.5 M $H_2SO_4$.
Figure 27:
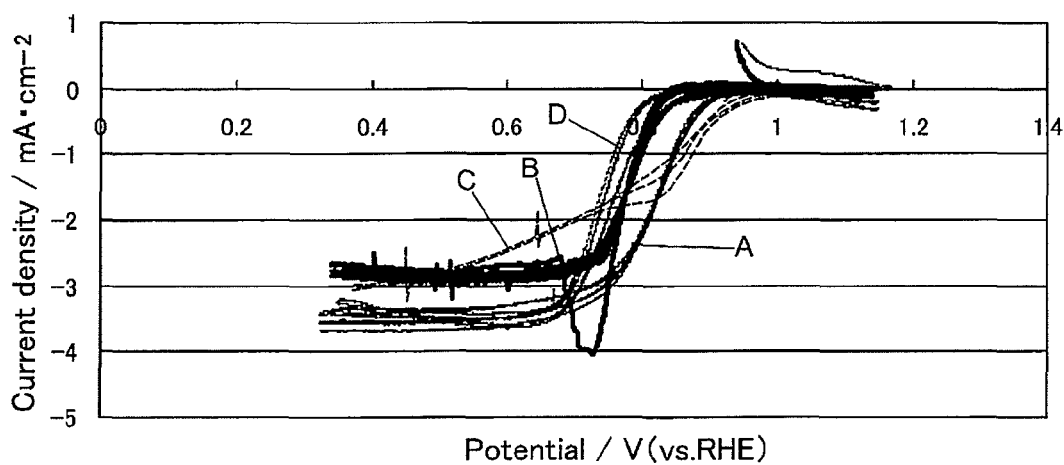
FIG. 27 is a graph showing voltammograms of the carbon-based materials of Examples 6 and 7 and Comparative Examples 3 and 4 obtained by rotating disk electrode voltammetry in the oxygen reduction region in 0.1 M NaOH.

FIG. 26 shows voltammograms obtained by use of the aqueous solution of 0.5 M $H_2SO_4$ as the electrolyte. FIG. 27 shows voltammograms obtained by use of the aqueous solution of 0.1 M NaOH as the electrolyte. Note that "A" denotes the results of Example 6, "B" denotes the results of Example 7, "C" denotes the results of Comparative Example 3, and "D" denotes the results of Comparative Example 4.

As shown in these results, regarding Example 6, an oxygen reduction reaction proceeds in the aqueous solution of $H_2SO_4$ when an electrode potential exceeds about 0.7 V (vs.RHE), and an oxygen reduction reaction proceeds in the aqueous solution of NaOH when an electrode potential exceeds about 0.9 V (vs.RHE). Onset potentials of the carbon-based material of Example 6 are comparable or superior to those of Comparative Examples 3 and 4, and a current in Example 6 at the onset potential of +0.6V is greater than those of Comparative Examples 3 and 4. Besides, regarding Example 7, an oxygen reduction reaction proceeds in the aqueous solution of $H_2SO_4$ when an electrode potential exceeds about 0.7 V (vs.RHE), and an oxygen reduction reaction proceeds in the aqueous solution of NaOH when an electrode potential exceeds about 0.85 V (vs.RHE). These catalytic activities reach the highest level in view of non-platinum based oxygen reduction catalysts.

Note that the reason why the catalytic performance of each of the carbon-based materials of Examples 6 and 7 is superior to that of the CoDAPP catalyst of Comparative Example 3 may be because in Comparative Example 4, an amount of the inactive metal compound or the metal crystal is increased, or a particle size thereof is increased due to the long sintering time in preparation of the CoDAPP. Hence, the catalytic activity thereof may be inhibited.

[Evaluation of Oxygen Evolution Activity]

Oxygen evolution activity of each of the carbon-based material of Example 7 and untreated amorphous carbon particles (available from Cabot corporation, the product name: VULCAN XC-72, the average primary particle diameter: 30 nm) when used as a catalyst were evaluated by the following manner.

First, electric wiring was provided on each of the carbon-based material and untreated amorphous carbon particles, and used as a working electrode. Voltammetry was conducted using this working electrode and an electrolyte of an aqueous buffer solution of 0.05 M phosphoric acid ($KH_2PO_4/Na_2HPO_4$) under conditions of a sweep speed of 10 mV/s.

Figure 28:
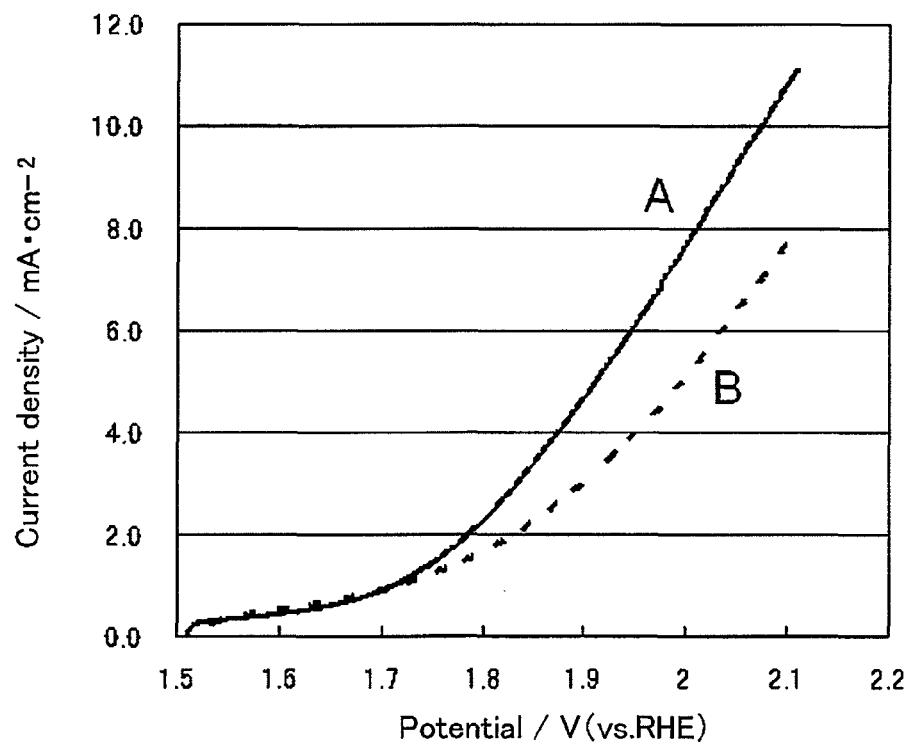
FIG. 28 is a graph showing voltammograms of amorphous carbon particles of Example 7 and untreated amorphous carbon particles in an oxide evolution region in an aqueous buffer solution of phosphoric acid.

FIG. 28 shows thus-obtained voltammogram. Note that "A" denotes the results of Example 7, and "B" denotes the results of the untreated amorphous carbon particles. As shown in these results, the untreated amorphous carbon particles have low oxygen evolution reaction activity. In contrast, regarding Example 7, a greater oxygen evolution current flows in the entire potential region.

[Evaluation of Heating Time in Preparation]

Six types of the carbon-based material were obtained in the same manner as that of Example 6 except for varying heating time of a sample in preparation of the carbon-based material.

Figure 29:
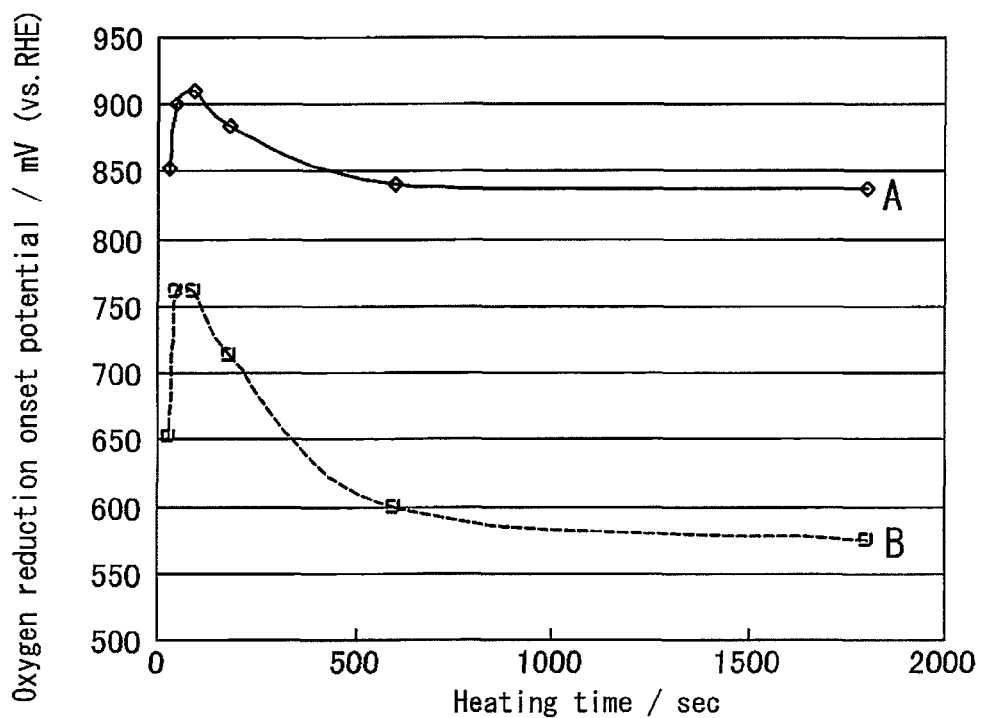
FIG. 29 is a graph showing onset oxygen reduction potentials of six types of the carbon-based material of Example 6 different in the heating time in the manufacturing process.

Regarding these six types of the carbon-based material, an onset potential of an oxygen reduction current was measured in each of cases of using the aqueous solution of 0.5 M $H_2SO_4$ as the electrolyte and using the aqueous solution of 0.1 M NaOH as the electrolyte. FIG. 29 shows the results. Note that, in FIG. 29, the horizontal axis shows the heating time of the sample and the vertical axis shows the onset potential. Besides, "A" denotes the result of the case using the aqueous solution of 0.1 M NaOH, and "B" denotes the result of the case using the aqueous solution of 0.5 M $H_2SO_4$.

These results teach that, in the heating time of 30 sec to 300 sec, the onset potential is remarkably high, namely, the catalytic activity is high. Besides, these results teach that, in the heating time of 40 sec to 120 sec, the catalytic activity is markedly high.

[Evaluation of Heating Temperature in Preparation]

Three types of the carbon-based material were obtained in the same manner as that of Example 6 except for varying heating temperature for a sample in preparation of the carbon-based material.

Figure 30:
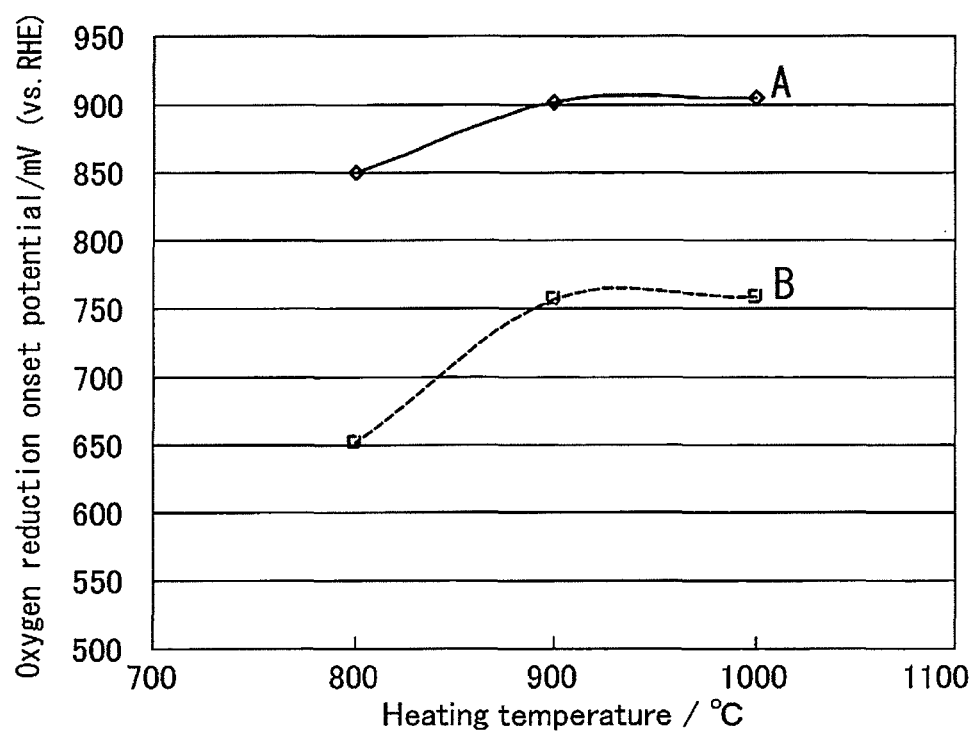
FIG. 30 is a graph showing onset oxygen reduction potentials of the three types of the carbon-based material of Example 6 different in the heating time in the manufacturing process.

Regarding these three types of the carbon-based material, an onset potential of an oxygen reduction current was measured in each of cases of using the aqueous solution of 0.5 M $H_2SO_4$ as the electrolyte and using the aqueous solution of 0.1 M NaOH as the electrolyte. FIG. 30 shows the results. Note that, in FIG. 30, the horizontal axis shows a heating temperature for the sample and the vertical axis shows the onset potential. Besides, "A" denotes the case of using the aqueous solution of 0.1 M NaOH, and "B" denotes the case of using the aqueous solution of 0.5 M $H_2SO_4$.

These results teach that in the heating temperature ranging from 800° C. to 1000° C., the onset potential is high, namely, the catalytic activity is high. Besides, these results teach that in the heating temperature ranging from 900° C. to 1000° C., the catalytic activity is markedly high.

INDUSTRIAL APPLICABILITY

The carbon-based material in accordance with the present invention and the carbon-based material prepared in the process in accordance with the present invention are suitable for use as a catalyst, and particularly as a catalyst for an electrode catalyst used to make an electrochemical reaction proceed on an electrode.

The electrode catalyst in accordance with the present invention is suitable for use as a catalyst for a gas diffusion electrode, but the application thereof is not limited.

The gas diffusion electrode in accordance with the present invention is suitable for use as an electrode of an electrochemical device such as a fuel battery, a water electrolysis device, a carbon dioxide permeation device, a brine electrolysis device, a metal fuel cell or the like, but the application thereof is not limited.

The invention claimed is:

1. A carbon-based material prepared by doping a base made of graphite or amorphous carbon particles with atoms of metal and non-metal, the non-metal including at least one of nitrogen, boron, sulfur, and phosphorus,
   when the metal is not platinum, in a radial distribution function obtained by Fourier transform of a K-edge extended X-ray absorption fine structure (EXAFS) of the metal, a ratio of "A" to "B" being equal to or more than 4.0, wherein "A" denotes an intensity of a highest one of peaks around a distance equal to a coordinate bond length between atoms of the metal and the non-metal and "B" denotes an intensity of a highest one of peaks around a distance equal to a metallic bond length between atoms of the metal, and
   when the metal is platinum, in a radial distribution function obtained by Fourier transform of an LIII-edge extended X-ray absorption fine structure (EXAFS) of the platinum, a ratio of "A" to "B" being equal to or more than 4.0, wherein "A" denotes an intensity of a highest one of peaks around a distance equal to a coordinate bond length between atoms of the platinum and the non-metal and "B" denotes an intensity of a highest one of peaks around a distance equal to a metallic bond length between atoms of the platinum.

2. The carbon-based material as set forth in claim 1, wherein
   a molar ratio of atoms of the metal to atoms of carbon determined by XPS is less than 0.01, and
   a molar ratio of atoms of the non-metal to atoms of the carbon is less than 0.05.

3. The carbon-based material as set forth in claim 1, comprising a core layer and a doped layer covering the core layer,
   the core layer substantially consisting of the graphite or the amorphous carbon alone, and
   the doped layer containing atoms of the non-metal and the metal.

4. The carbon-based material as set forth in claim 1, wherein
   an X-ray diffraction pattern of the carbon-based material shows that a proportion of an intensity of a highest one of peaks derived from an inactive metal compound and a metal crystal to an intensity of a (002) peak is not more than 0.1.

5. The carbon-based material as set forth in claim 1, wherein
   the carbon-based material has a particle shape.

6. The carbon-based material as set forth in claim 1, wherein:
   the non-metal includes nitrogen; and
   the metal includes iron.

7. The carbon-based material as set forth in claim 1, wherein:
   the non-metal includes nitrogen; and
   the metal includes at least one of cobalt and manganese.

8. An electrode catalyst comprising the carbon-based material as set forth in claim 1.

9. An electrode comprising the electrode catalyst as set forth in claim 8.

10. A gas diffusion electrode comprising the electrode catalyst as set forth in claim 8.

11. An electrochemical device comprising the electrode as set forth in claim 9.

12. A fuel battery comprising the electrode as set forth in claim 9.

13. A process for producing the carbon-based material,
   the carbon-based material prepared by doping a base made of graphite or amorphous carbon particles with atoms of metal and non-metal, the non-metal including at least one of nitrogen, boron, sulfur, and phosphorus,
   when the metal is not platinum, in a radial distribution function obtained by Fourier transform of a K-edge extended X-ray absorption fine structure (EXAFS) of the metal, a ratio of "A" to "B" being equal to or more than 4.0, wherein "A" denotes an intensity of a highest one of peaks around a distance equal to a coordinate bond length between atoms of the metal and the non-metal and "B" denotes an intensity of a highest one of peaks around a distance equal to a metallic bond length between atoms of the metal, and
   when the metal is platinum, in a radial distribution function obtained by Fourier transform of an LIII-edge extended X-ray absorption fine structure (EXAFS) of the platinum, a ratio of "A" to "B" being equal to or more than 4.0, wherein "A" denotes an intensity of a highest one of peaks around a distance equal to a coordinate bond length between atoms of the platinum and the non-metal and "B" denotes an intensity of a highest one of peaks around a distance equal to a metallic bond length between atoms of the platinum, the process comprising steps of:

preparing a mixture of a non-metal containing compound, a metal compound, and a carbon source material, the non-metal containing compound containing non-metal including at least one of nitrogen, boron, sulfur, and phosphorus, and the carbon source material being selected from a group consisting of graphite and amorphous carbon particles; and heating the mixture to a temperature ranging from 800° C. to 1000° C. for a time of 45 sec or more but less than 600 sec when the carbon source material is graphite; or heating the mixture at a temperature ranging from 800° C. to 1000° C. for a time of 30 sec or more but less than 300 sec when the carbon source material is the amorphous carbon particles.

14. The process for producing a carbon-based material as set forth in claim 13, wherein the non-metal containing compound has a molecular weight of 800 or less.

15. The process for producing a carbon-based material as set forth in claim 13, wherein the non-metal containing compound includes at least one compound selected from a group consisting of pentaethylenehexamine, tetraethylenepentamine, triethylenetetramine, and ethylenediamine.

16. An electrochemical device comprising the gas diffusion electrode as set forth in claim 10.

17. A fuel battery comprising the gas diffusion electrode as set forth in claim 10.

* * * * *